United States Patent [19]

Ohta et al.

[11] Patent Number: 5,430,525
[45] Date of Patent: Jul. 4, 1995

[54] IMAGE PROCESSING APPARATUS

[75] Inventors: Eiji Ohta, Fujisawa; Masahiro Funada, Yokohama; Ken-ichi Ohta, Kawasaki; Yutaka Udagawa, Machida; Yoichi Takaragi, Yokohama, all of Japan

[73] Assignee: Canon Kabushiki Kaisha, Tokyo, Japan

[21] Appl. No.: 801,963

[22] Filed: Nov. 27, 1991

[30] Foreign Application Priority Data

Nov. 30, 1990 [JP] Japan ................................. 2-330880
Nov. 30, 1990 [JP] Japan ................................. 2-330881
Nov. 30, 1990 [JP] Japan ................................. 2-330882

[51] Int. Cl.$^6$ .................................................. G03G 21/00
[52] U.S. Cl. .................................... 355/201; 283/902; 356/71; 382/181
[58] Field of Search ............. 355/201, 206, 327, 77, 355/133; 283/902; 380/3, 4, 5, 54; 382/10, 14, 30, 34, 41, 48, 50, 56; 356/71

[56] References Cited

U.S. PATENT DOCUMENTS

| 4,066,280 | 1/1978 | La lapria | 427/7 X |
|---|---|---|---|
| 4,325,981 | 4/1982 | Sugiura et al. | 427/7 |
| 4,739,377 | 4/1988 | Allen | 355/133 |
| 4,908,873 | 3/1990 | Philibert et al. | 355/201 X |
| 5,075,767 | 12/1991 | Takaragi | 358/75 |

FOREIGN PATENT DOCUMENTS 0312301 4/1989 European Pat. Off. .
0342060 11/1989 European Pat. Off. .

OTHER PUBLICATIONS

Hildenbrandt, L. H., Document Security For Copiers, IBM Tech. Disclosure Bulletin, vol. 19, No. 9, Feb. 1977, pp. 3293-3294.

Primary Examiner—Leo P. Picard
Assistant Examiner—Christopher Horgan
Attorney, Agent, or Firm—Fitzpatrick, Cella, Harper & Scinto

[57] ABSTRACT

Disclosed is an image processing apparatus having plural types of input devices (scanners, a still-video camera, a film scanner, etc.) for inputting image data. The type of input device which has entered the image data is identified, and an image judging processing method is decided from plural types of such methods based upon the type of input device identified. In accordance with the image judging processing method decided, the identity is judged between the image data inputted from the input device of the type identified and a specific image.

26 Claims, 26 Drawing Sheets

| DSL SIGNAL | DEVICE NAME |
|:---:|:---:|
| 0 | SCANNER |
| 1 | FILM SCANNER |
| 2 | SV |

FIG. 6

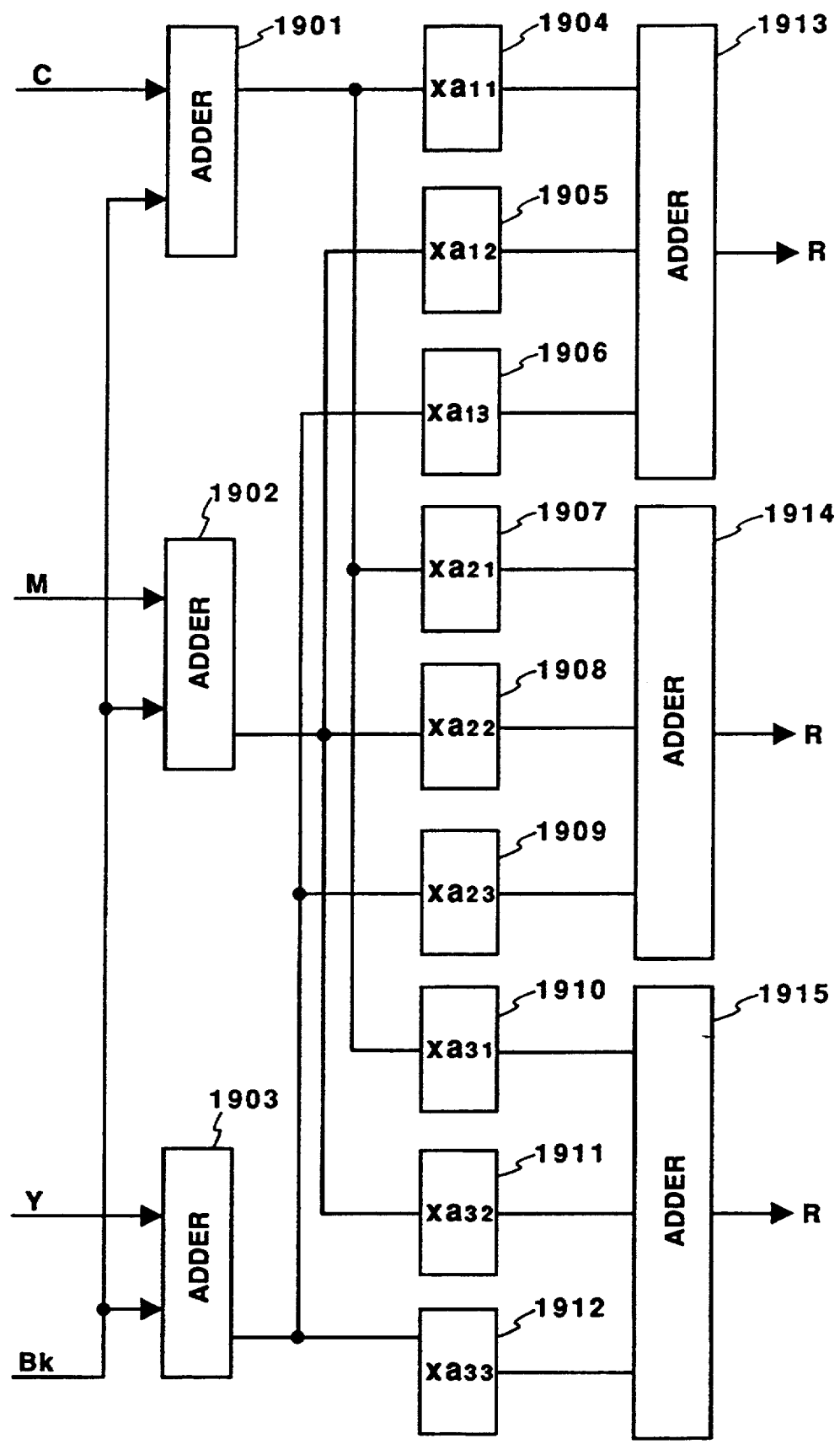
F I G. 22

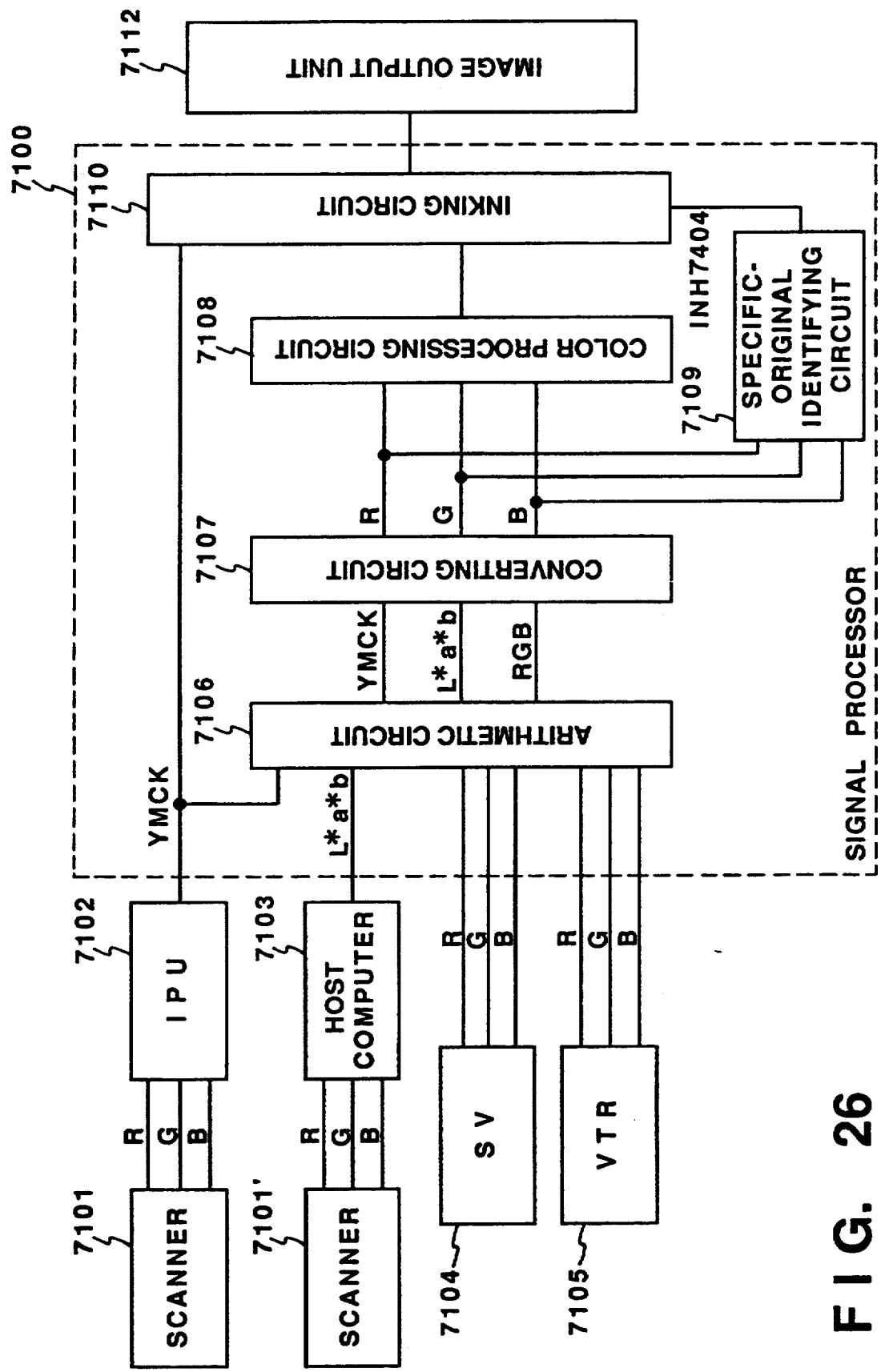
F I G. 26

IMAGE PROCESSING APPARATUS

BACKGROUND OF THE INVENTION

1. Field of the Invention

This invention relates to an image processing apparatus and, more particularly, to an image processing apparatus capable of being applied to a device such as a copying machine equipped with a function for detecting a specific original.

2. Prior Art

Recent improvements in the picture quality of copying machines which now have a color capability have been accompanied by the fear of counterfeiting of specific originals such as bank notes and securities. A proposed method of detecting a specific original in a copying machine is pattern matching in which an input image and the shape of a specific image are compared. In order to determine whether an original placed at any position on a platen is a specific original, the position at which the original has been placed or the angle of the original is calculated and then pattern matching is performed.

In the example of the prior art described above, however, the reader is merely a scanner. In a case, fore example, where a plurality of input devices such as film scanners or still-video cameras are connected, an accurate judgment concerning a specific original cannot be made owing to differences in the conditions of the input sensors.

Further, in the example of the prior art described above, a color original is judged based solely upon R, G, B signals obtained by separation into three colors using an RGB CCD sensor. Consequently, when, for example, an image output apparatus is connected to a host computer or the like, image processing is executed by the computer and Y, M, C, Bk signals are sent to the image output apparatus, detection of a specific original of interest cannot be carried out. In other words, detection cannot be performed in case of a color space in which the data of the inputted color components differs from the color-component data used in detection.

SUMMARY OF THE INVENTION

An object of the present invention is to provide an image processing apparatus capable of eliminating the aforementioned drawbacks of the prior art described above.

Another object of the present invention is to provide an image processing apparatus capable of distinguishing a specific original more accurately.

Still another object of the present invention is to provide an image processing apparatus capable of distinguishing a specific original, irrespective of the form of an input signal, in an ordinary image copying operation or in a case where an image is outputted upon receiving a signal from an external device.

A further object of the present invention is to provide an image processing apparatus having input means of a plurality of types for inputting image data, the apparatus comprising identifying means for identifying the type of the input means which has inputted the image data, decision means for deciding an image judging processing method, from among a plurality of image judging processing methods, based upon the type of input means identified by the identifying means, and judging means for judging identity similarity between a specific image and image data, which has been inputted from the input means of the type identified by the identifying means, in accordance with the image judging processing method decided by the decision means.

A further object of the present invention is to provide an image processing apparatus comprising input means for inputting an image signal corresponding to an original image, converting means for converting the signal form of the image signal inputted by the input means, judging means for judging identity between the original image and a specific image based upon the signal converted by the converting means, and processing means for processing the image signal, which has been inputted by the input means, based upon the results of judgment performed by the judging means.

A further object of the present invention is to provide an image processing apparatus having an interface connected to a plurality of input devices which handle image signals of different color spaces, the apparatus comprising input means for inputting an image signal, which corresponds to an original, from one of the connected input devices, converting means for converting the image signal, which has been inputted by by the input means, into an image signal in a prescribed color space, discriminating means for determining whether a previous registered specific original is present based upon the image signal converted by the converting means, and processing means for processing the image signal, which has been inputted by the input means, based upon the results of the determination made by the discriminating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram for describing the correspondence between DSL signals and the names of devices in the first embodiment;

FIG. 22 is a block diagram showing the construction of an arithmetic circuit 1202 according to the third embodiment;

FIG. 26 is a block diagram showing a sixth embodiment of a copying machine to which the image processing apparatus of the present invention is applied.

DESCRIPTION OF THE PREFERRED EMBODIMENTS

Preferred embodiments of the present invention will now be described in detail with reference to the accompanying drawings.

It should be noted that the term "specific original" as used hereinafter refers to originals the duplication of which is prohibited, such as securities, gift certificates and bank notes, and includes also originals which are contrary to public order and good customs and other originals for specific applications.

Although a copying machine is illustrated as an example of application of the present invention in each of the following embodiments, it goes without saying that this does not impose a limitation upon the invention, which can be applied also to various other apparatus, such as printers.

(First Embodiment)

<External view of apparatus>

Figure 1:
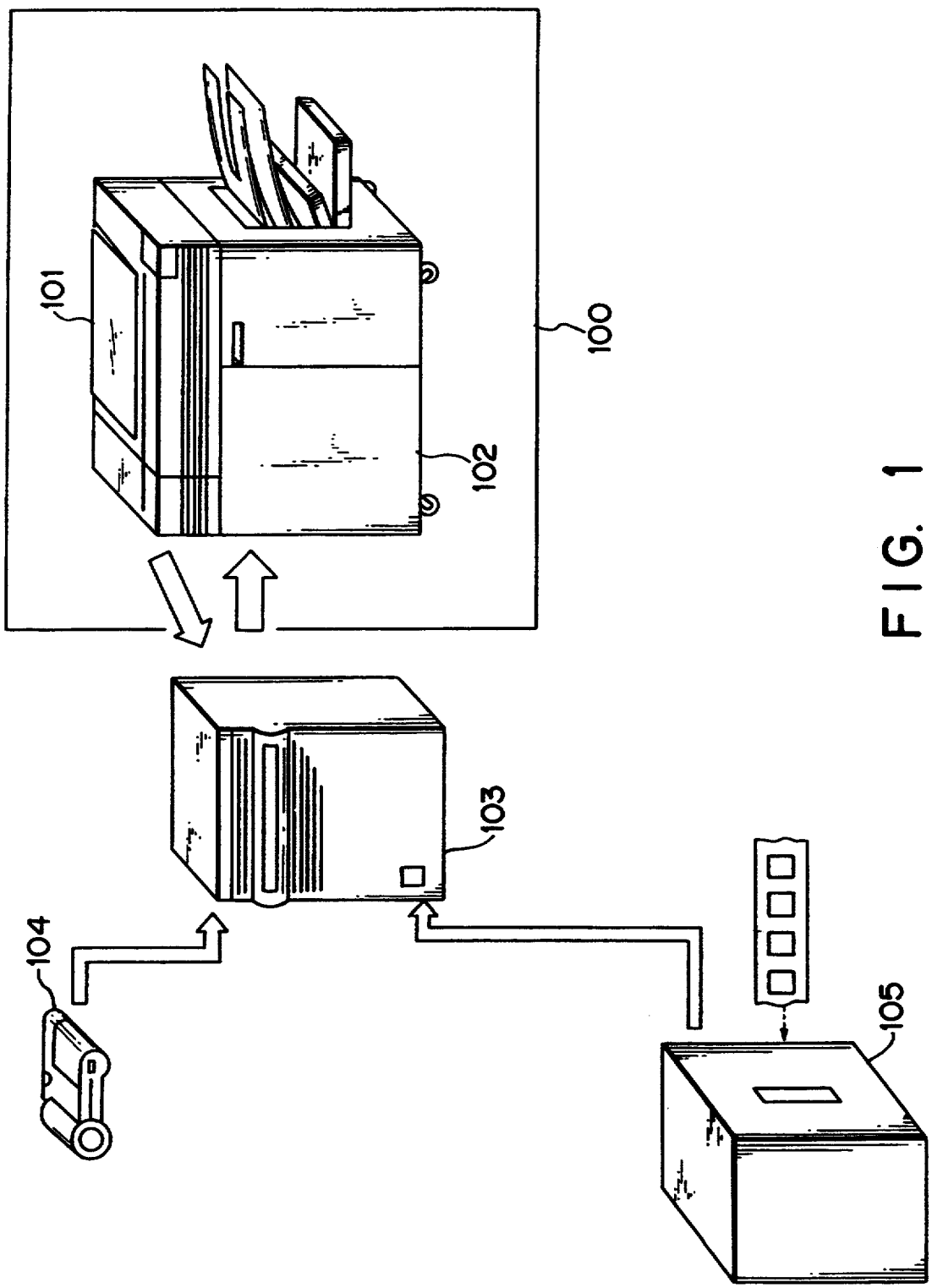
FIG. 1 is an external view showing a first embodiment of a copying machine to which the image processing apparatus of the present invention is applied.

FIG. 1 is an external view showing a first embodiment of a copying machine to which the image processing apparatus of the present invention is applied.

Shown in FIG. 1 are a laser color copier 100, which includes a scanner (reader) 101 and a color printer 102. Shown also are an image processing unit (hereinafter referred to as an "IPU") 103 to which input units of a plurality of types are connected, for example, a still-video camera (hereinafter referred to as an "SV") 104, and a film scanner 105 for reading 35 mm film by using CCP sensors.

<Signal processing block diagram of IPU 103>

Figure 2:
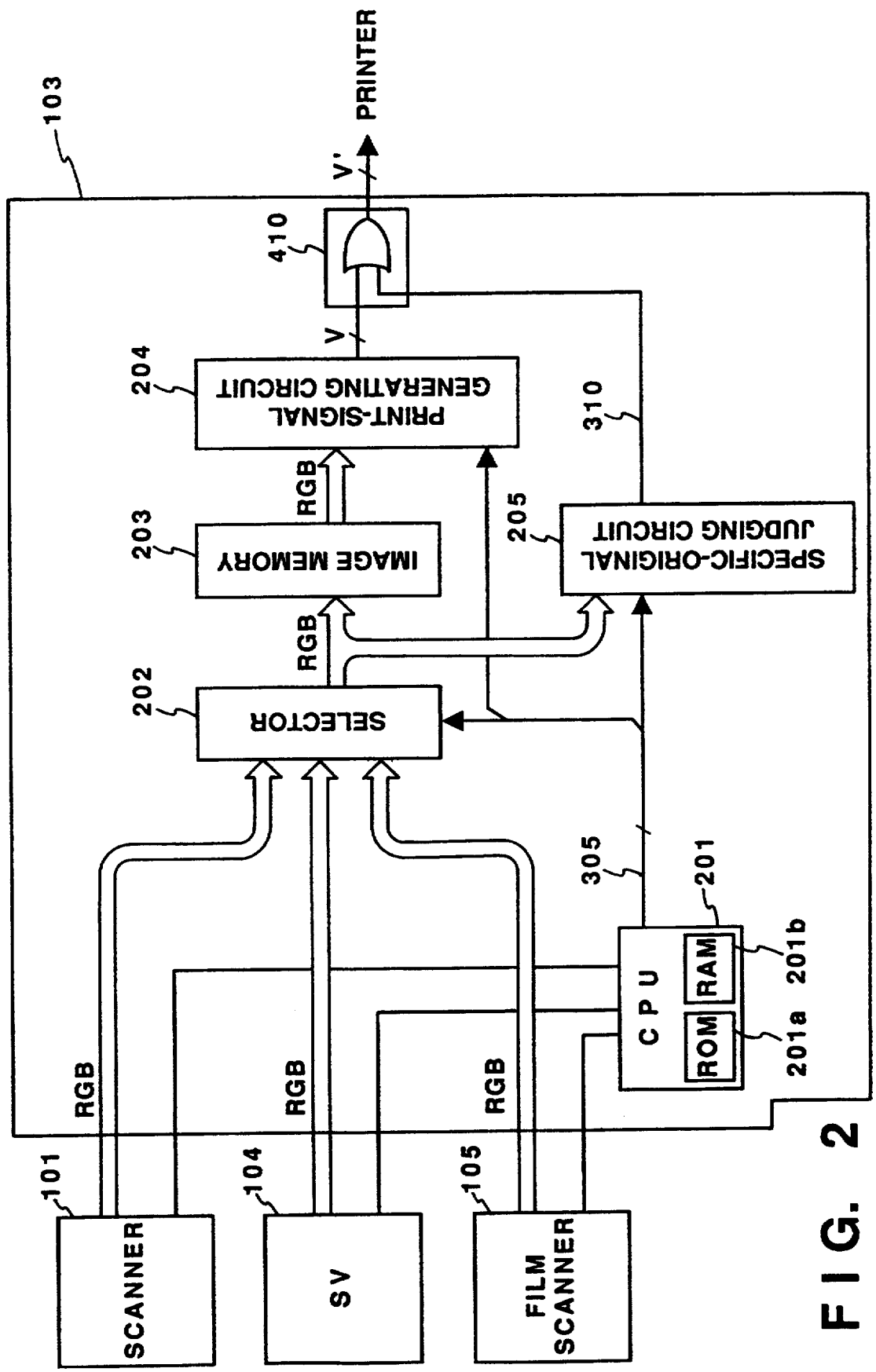
FIG. 2 is a block diagram showing the signal processing components of an IPU 103 according to the first embodiment.

FIG. 2 is a block diagram showing the signal processing components of the IPU 103 according to the first embodiment. As shown in FIG. 2, a CPU 201 serving as a system controller communicates with the scanner 101, SV 104, etc., and controls the IPU 103. A selector 202 selects image data from one of the input units based upon the value of an input-unit selecting signal DSL 305. An image memory 203 stores the inputted image data. A print-signal generating circuit 204 generates a print color signal which is Y, M, C, Bk frame-sequence for performing a masking UCR operation. A specific-original judging circuit 205 identifies a specific original from an RGB signal and generates a judgment signal H310. An OR circuit 410 takes the OR between each bit of an eight-bit output V of the print-signal generating circuit 204 and a judgment signal H outputted by judging means, described below. The OR circuit 410 outputs a signal V', which is the result of the OR operation.

When the judgment signal H is logical "1", namely when it is determined that a specific original has been read, the output V' of the OR circuit 410 becomes $FF_{HEX}$ (255), irrespective of the value of the input signal V. When the judgment signal H is logical "0", namely when it is determined that a specific original has not been read, the value of the input signal V is outputted unchanged as the output signal V'.

Figure 9:
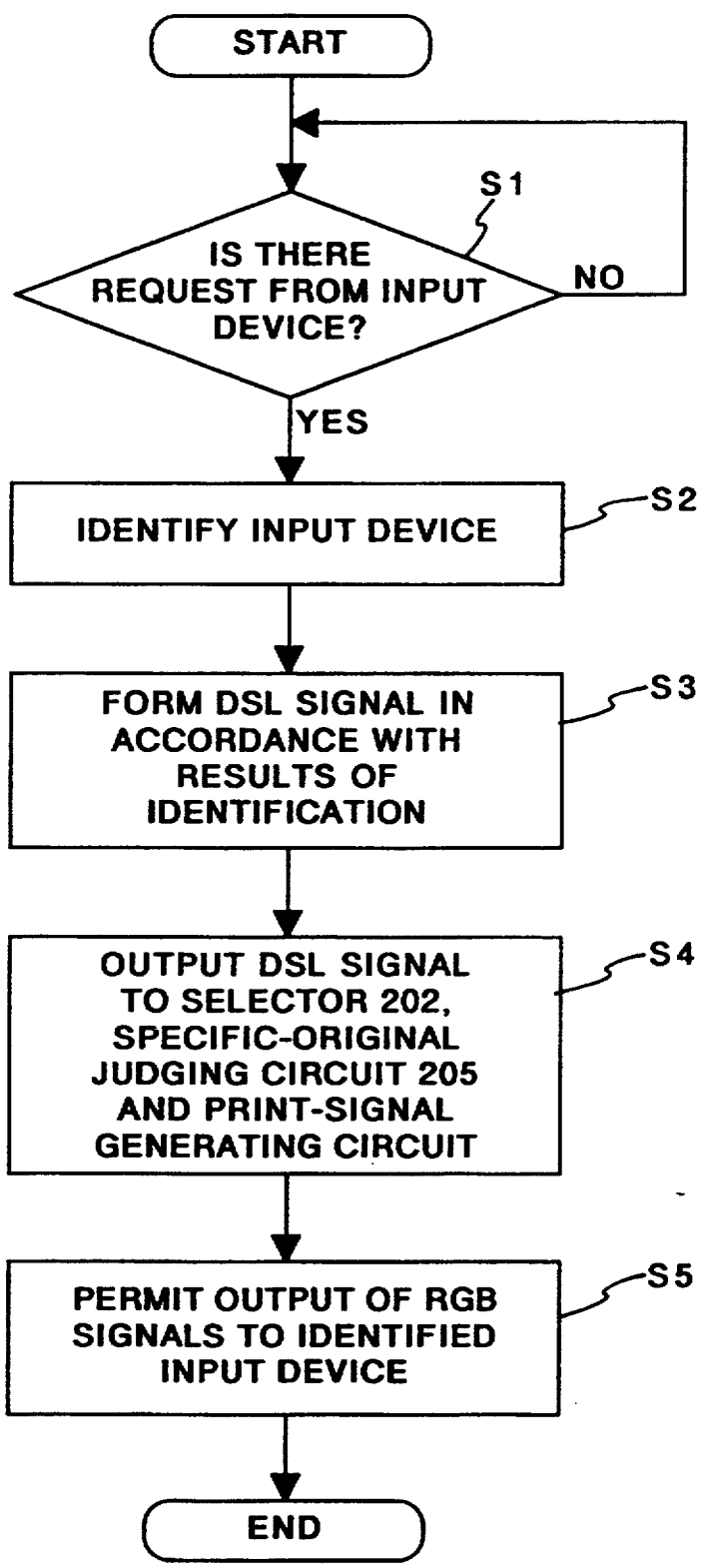
FIG. 9 is a flowchart for describing the procedure for generating a DSL signal 305 in the first embodiment.

A ROM 201a stores a program, which is in accordance with the flowchart of FIG. 9, for operating the CPU 201, and a RAM 201b is used as a working area of the program stored in the ROM 201a.

The principal operation of the CPU 201 will now be described.

FIG. 9 is a flowchart for describing a procedure for generating the DSL signal 305, and FIG. 6 is a diagram for describing the correspondence between the DSL signal and the names of the input devices.

First, upon receiving an RGB-signal output request from an input device (step S1), the CPU 201 identifies whether the request is from the scanner 101, the SV 104 or the film scanner 105 (step S2). Next, in accordance with the results of identification, the CPU 201 produces the DSL signal 305 (step S3) indicating the scanner 101, the SV 104 or the film scanner 105 and outputs the produced DSL signal 305 to the selector 202, print-signal generating circuit 204 and specific-original judging circuit 205 simultaneously (step S4). In accordance with FIG. 6, the DSL signal 305 is "0" when the input device identified is the scanner 101, "1" when the input device identified is the film scanner 105, and "2" when the input device identified is the SV 104. Thereafter, at step S5, the CPU 201 permits the output of the RGB signal to the input device identified at step S2.

<Judging means>

Figure 3:
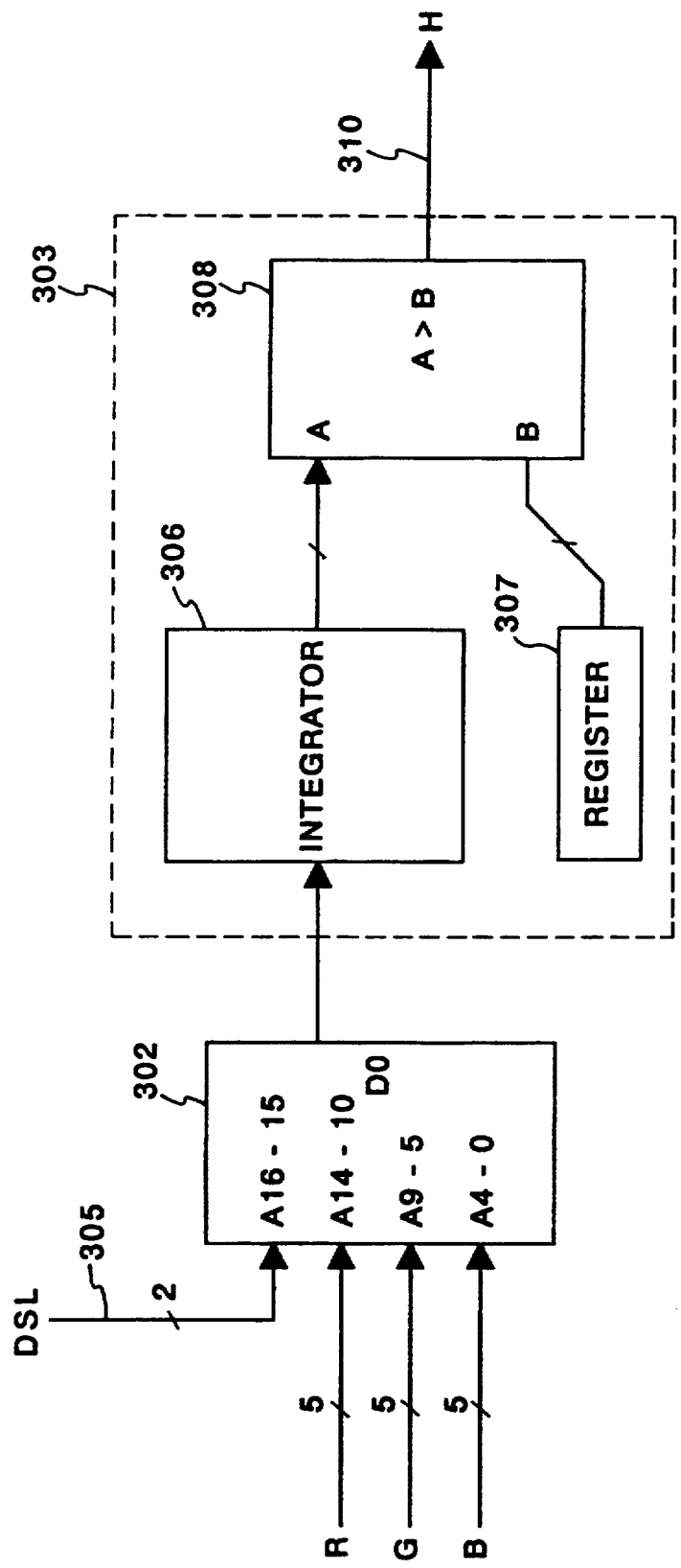
FIG. 3 is a block diagram showing the construction of a specific-original judging circuit 205 according to the first embodiment.

FIG. 3 is a block diagram illustrating the construction of the specific-original judging circuit 205 according to the first embodiment. In FIG. 3, numeral 302 denotes a color matching look-up table (hereinafter referred to as a "judging ROM"), which is constituted by a read-only memory, for performing color matching with regard to a specific original. Color distribution is investigated beforehand with regard to specific originals conforming to the respective conditions of the plurality of input devices. The judging ROM 302 holds the results obtained by performing judgment, these results indicating whether the color of a pertinent pixel coincides with a color of the specific originals.

More specifically, in the judging ROM 302, the DSL signal, which is an input-device selecting signal, is inputted to the two higher order address bits, and five higher order bits of the image signal of each of the colors R, G, B are inputted to the 15 lower order address bits. In conformity with the values "0", "1", "2" of the input-device selecting signal 305, whether or not the color of a pertinent pixel coincides with the color in a specific original is outputted upon being made to correspond to data of eight bits, and a specific original corresponding to the input conditions of the input device is judged.

Numeral 303 denotes a color judging circuit, which comprises an integrator 306, a register 307 and a comparator 308, for determining whether an original contains a specific original.

<Construction of judging ROM 302>

Figure 4:
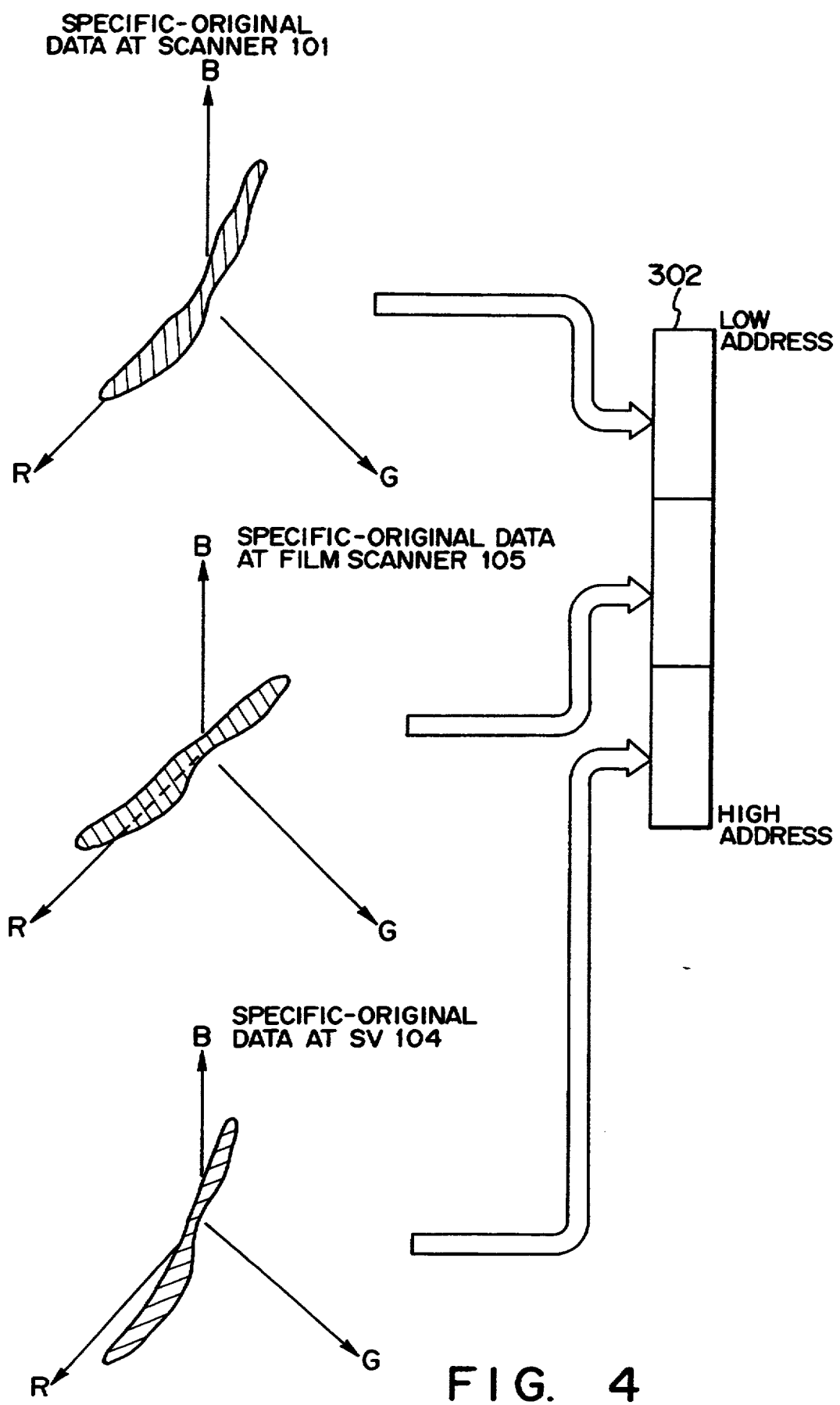
FIG. 4 is a diagram showing the relationship between a ROM 302 and the distribution, in R, G, B space, of input data from respective input units when a specific original has been inputted in the first embodiment.

FIG. 4 is a diagram showing the relationship between the judging ROM 302 and the distribution, in R, G, B space, of the image data of respective input devices when a specific original has been inputted in the first embodiment.

In FIG. 4, the judging ROM is so adapted that "1" is outputted when R, G, B signals which match the portion indicated by the slanted lines have been inputted, and "0" otherwise.

<Integrator 306>

Figure 5:
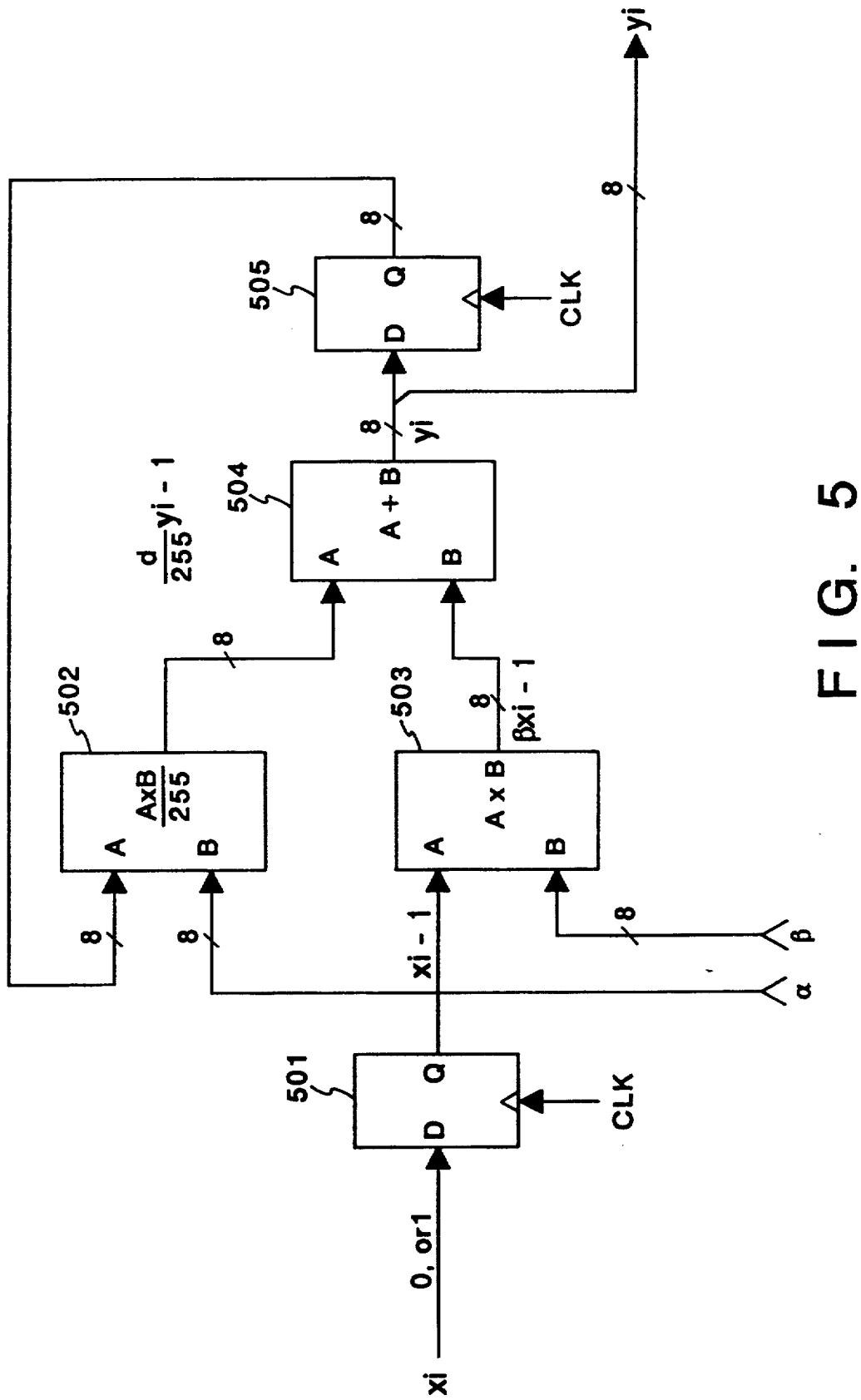
FIG. 5 is a block diagram showing the construction of an integrator 306 according to the first embodiment.

FIG. 5 is a block diagram showing the construction of the integrator 306 according to the first embodiment. In FIG. 5, numerals 501, 505 denote flip-flops which hold data at the timing of the leading edge of a clock signal CLK. The signal CLK is synchronized to the input of pixels to selector 202. Numeral 502 denotes a multiplier to which two eight-bit signals (A, B) are inputted. The multiplier 502 multiplies these signals together and outputs an eight-bit signal $(A \times B)/(255)$ as the result. Numeral 503 denotes a multiplier to which a one-bit input signal (A) and an eight-bit input signal (B) are applied. The multiplier 503 multiplies these signals together and outputs an eight-bit signal $(A \times B)$ as the result. Numeral 504 denotes an adder to which two eight-bit signals (A, B) are inputted. The multiplier 504 adds these signals together and outputs an eight-bit signal $(A+B)$ as the result.

Accordingly, in the integrator 306 of this embodiment, an eight-bit output signal $y_i$ is expressed by the following equation when a two-valued input signal $x_1$ is applied:

$$y_i = (\alpha/255)y_{i-1} + \beta \cdot x_{x-1} \quad (1)$$

where $\alpha$ and $\beta$ represent constants that have been preset. The various characteristics of the integrator are decided by the sizes of these values.

Figure 7A:
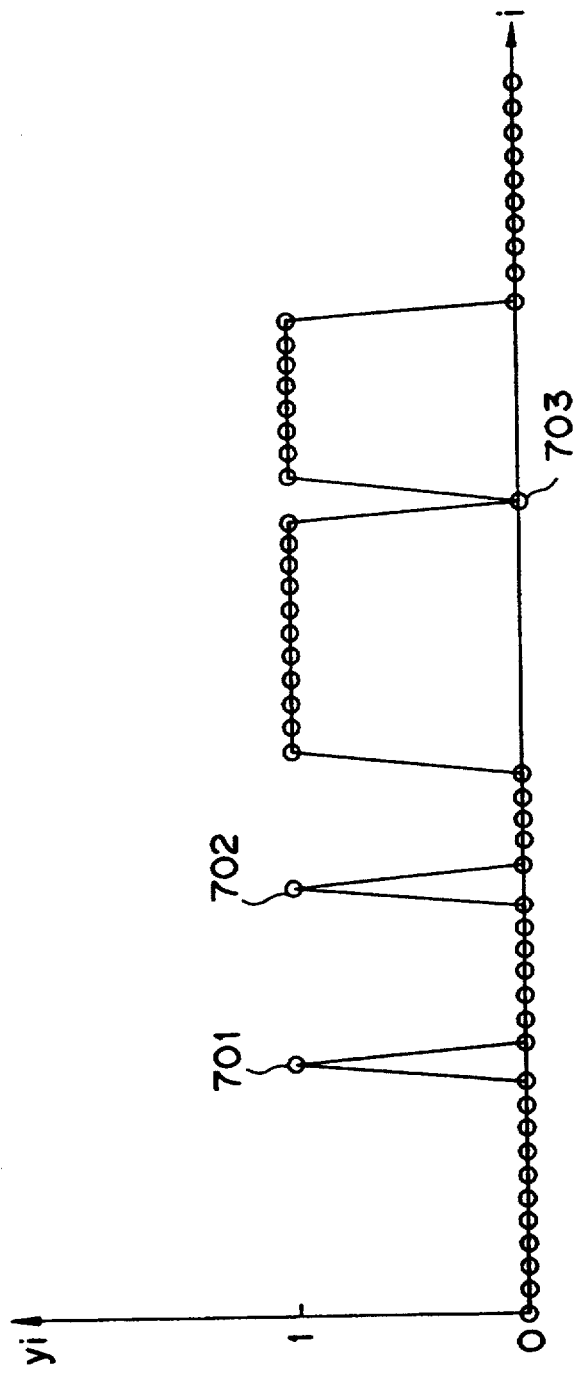
FIGS. 7A and 7B are diagrams for describing the input/output of the integrator 306 according to the first embodiment.
Figure 7B:
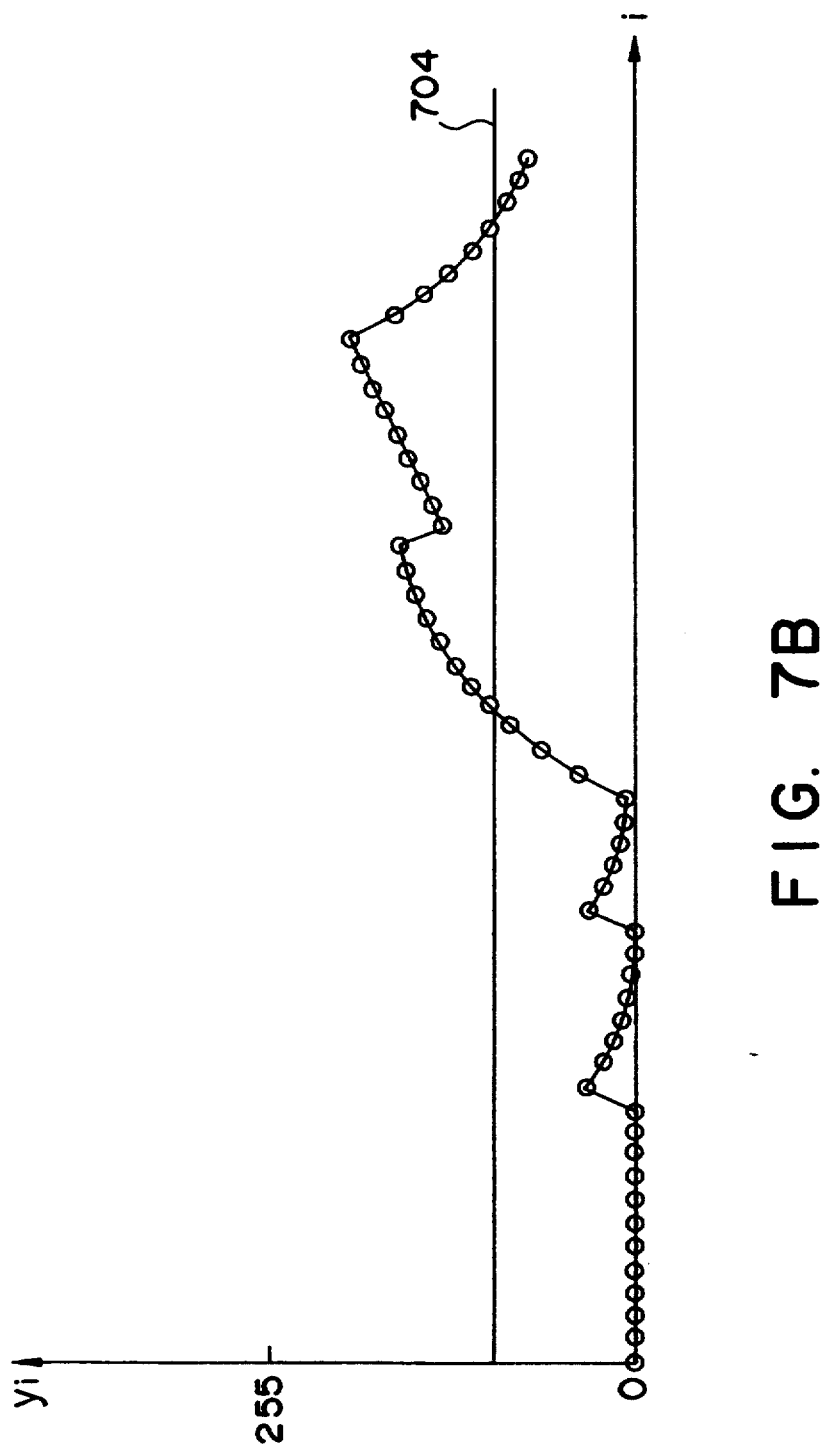

FIGS. 7A and 7B are diagrams for describing the input and output of the integrator 306 according to the first embodiment.

For example, in a case where $\alpha = 247$, $\beta = 8$ holds, an output $y_i$ of the kind shown in FIG. 7B is produced in response to an input $x_{i-1}$ of the kind shown in FIG. 7A.

Regardless of the fact that the periphery is almost "0", as in the manner of input $x_{i-1}$ indicated at 701, 702, an input of kind "1" is considered to be noise. Similarly, regardless of the fact that the periphery is almost "1", as in the manner of input $x_{x-1}$ indicated at 703, an input of kind "0" is considered to be noise. This is processed by the integrator, an appropriate threshold value of the kind indicated at 704 is set in the register 307 of FIG. 3, and the output $y_i$ of the integrator is binarized based upon this threshold value, thereby making it possible to eliminate the noise.

<Results of processing>

Figure 8:
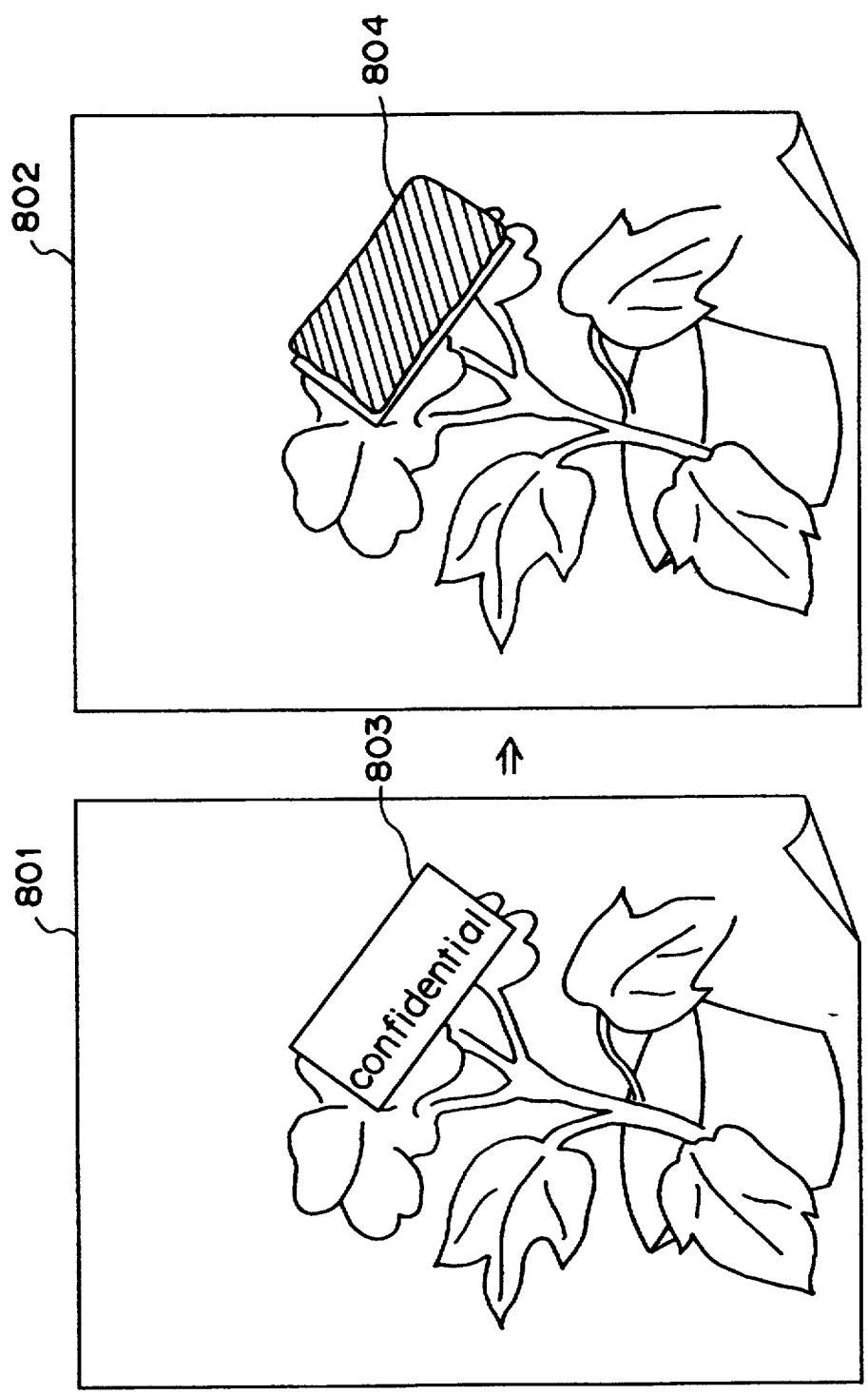
FIG. 8 is a diagram showing an example of processed results according to the first embodiment.

FIG. 8 is a diagram showing an example of the results of processing according to the first embodiment. In FIG. 8, numeral 801 denotes an original and numeral 803 designates a specific original which, in this apparatus, is to be judged as part of an image. Numeral 802 represents outputted results in a case where the original 801 has been copied in this apparatus, and numeral 804 represents a suppressed portion that has been painted out. This portion corresponds to the specific original 803.

When the original 801 is read in the first embodiment, the specific original 803 is judged as being a specific original from the color components of the read image in accordance with the judging means corresponding to the input device. In accordance with the results of this discrimination operation, the suppressed portion 804 corresponding to the specific original 803 is formed on the outputted results 802, and the copying operation is completed.

Thus, in accordance with the first embodiment described above, data for judging a specific original is changed over to data for judgment suited to an input device in a copying machine to which a plurality of input devices are connected. This makes it possible to distinguish a specific original more accurately.

(Second Embodiment)

Figure 10:
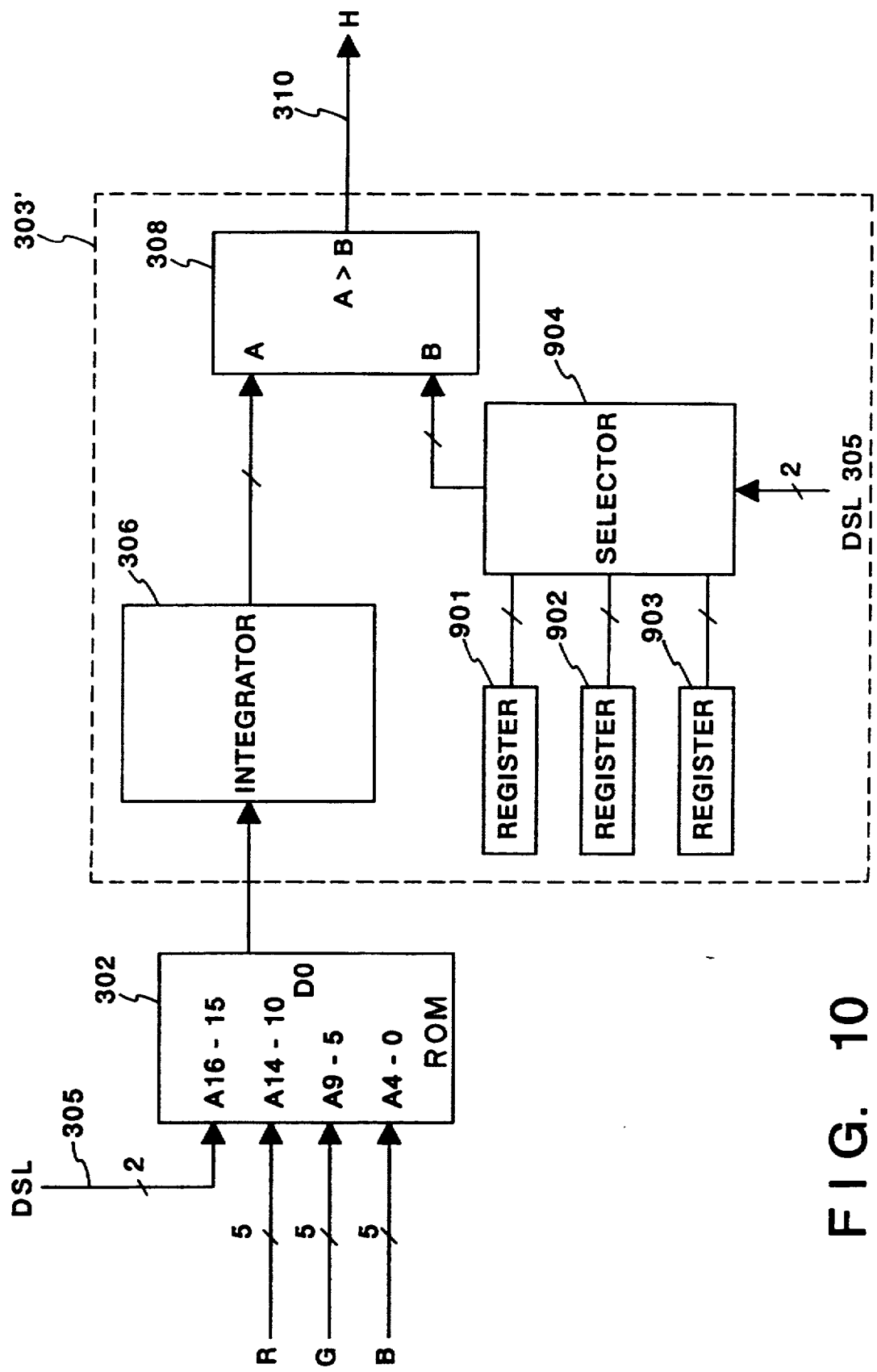
FIG. 10 is a block diagram showing the construction of a specific-original judging circuit 205 according to a second embodiment of the present invention.

FIG. 10 is a block diagram showing the construction of the specific-original judging circuit 205 according to a second embodiment of the present invention.

In the second embodiment, the threshold value 704 of FIG. 7B is selected by the value of the input-device selecting signal DSL 305. If the threshold value 704 is made small, the detection output of a specific original can be raised.

In this embodiment, the input devices are of three kinds, namely the scanner 101, SV 104 and film scanner 105. The resolution of the SV 104 is lower than that of the other two devices. Accordingly, the output of a counterfeit from the SV 104 has a lower resolution than that from the other two devices, and therefore the possibility that the SV 104 will be used for counterfeiting is not as high. This means that the threshold value 704 for the SV 104 may be set higher than those of the other two input devices.

In FIG. 10, portions identical with those of the first embodiment are designated by like reference characters and need not be described again. Numeral 303' denotes a color judging circuit according to the second embodiment. The color judging circuit 303' includes a register 901 in which a threshold value corresponding to the scanner 101 is stored, a register 902 in which a threshold value corresponding to the film scanner 105 is stored, and a register 903 in which a threshold value corresponding to the SV 104 is stored.

A selector 904 selects and outputs one of the values in the registers 901, 902, 903 in conformity with the value of the input-device selecting signal DSL 305. As a result, the detection level of a specific original can be varied in conformity with the capability of the input device.

(Third Embodiment)

Figure 11:
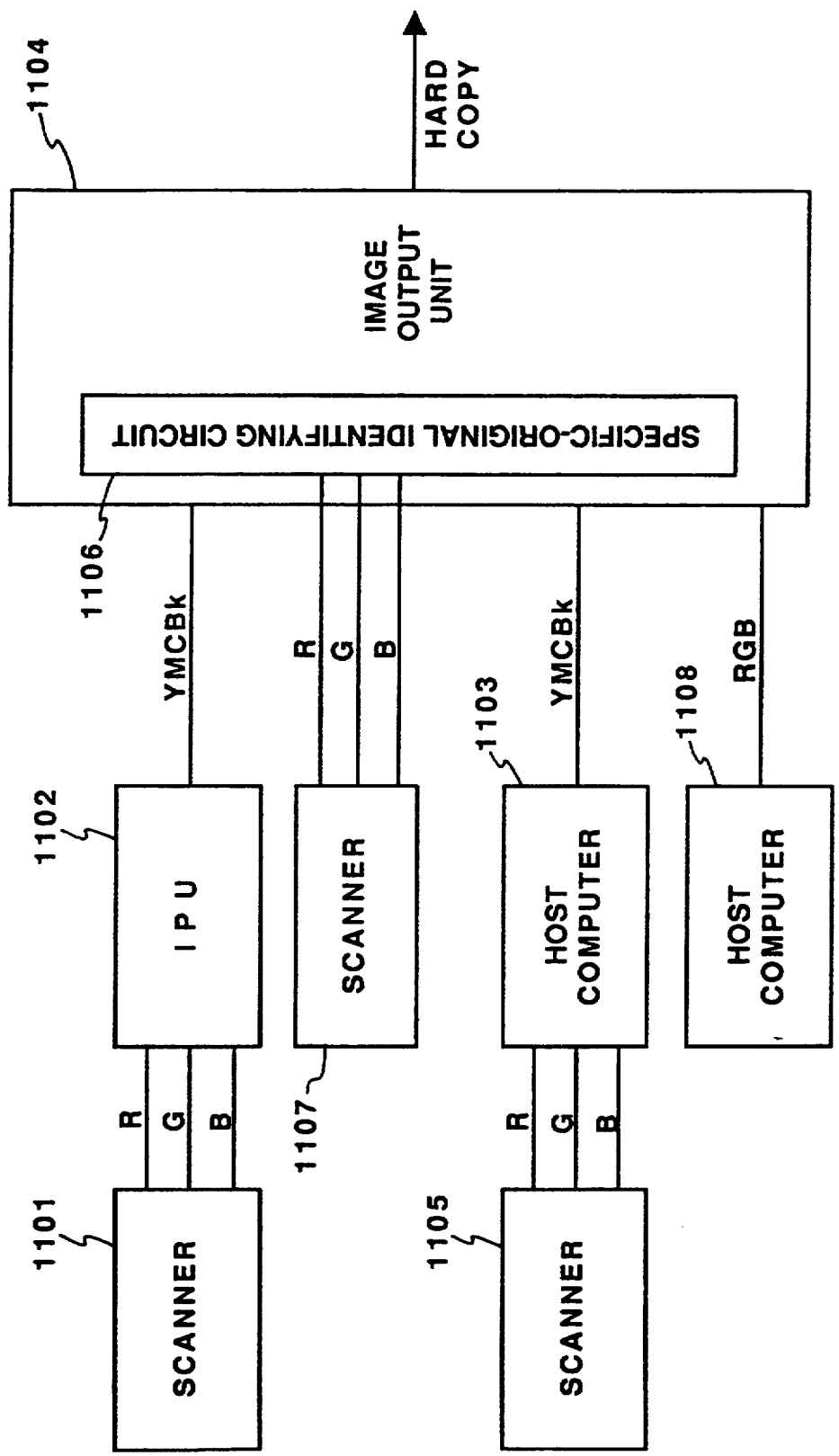
FIG. 11 is block diagram showing a third embodiment of a copying machine to which the image processing apparatus of the present invention is applied.

FIG. 11 is a block diagram showing a third embodiment of a copying machine to which the image processing apparatus of the present invention is applied. Shown in FIG. 11 are a scanner 1101 for optically reading an original image and obtaining R, G, B signals for every pixel and outputting the signals parallely, an image processing unit (IPU) 1102 for converting the R, G, B signals into frame-sequence (one page of image data is sequentially transmitted every color component, one page includes various sizes of image, for example A4, A3, B4 and B5) Y, M, C, Bk color image signals in accordance with the R, G, B parallel signals from the scanner 1101, a scanner 1105 having a function similar to that of the scanner 1101, a host computer 1103 for converting the R, G, B signals into frame-sequence Y, M, C, Bk color image signals in the same manner as the IPU 1102, an image output unit 1104 for controlling an image output conforming to the read original in accordance with the frame-sequence Y, M, C, Bk color image signals from the IPU 1102 or host computer 1103, a specific-original identifying circuit 1106, provided within the image output unit 1104, for identifying a specific original in accordance with the frame-sequence Y, M, C, Bk color image signals from the IPU 1102 or host computer 1103, and a scanner 1107 for inputting dot-sequence (meaning that a plurality of pixel data is transmitted for every pixel R, G, B parallel) data directly to the specific-original identifying circuit 1106. Though the image output unit 1104 in FIG. 11 has an interface connected to two types of input devices, namely the IPU 1102 and the host computer 1103, connection to three or more types of input devices also is possible. Furthermore, connection can be made to a host computer 1108 for inputting RGB serial signals. In addition, connection can be made not only to a computer but also to an input device such an SV (still-video) camera or VTR.

The operation of this embodiment will now be described. A color original is separated into the three colors R, G, B and digitally read by the image scanner 1101 (or 1105), and the resulting R, G, B signals are sent to an apparatus, which has an image processing function, such as the IPU 1102 (or host computer 1103). In the IPU 1102 or host computer 1103, the inputted R, G, B signals are converted into the frame-sequential color image signals Y, M, C, Bk by processing such as performed by the image processor of an ordinary digital color copying apparatus. This processing includes a logarithmic conversion, a masking operation and UCR (under-color rejection). The converted Y, M, C, Bk signals are sent to the image output unit 1104, where a hard copy is outputted by a laser beams, LED or other system.

In the third embodiment, a copying machine is illustrated in which the image output unit 1104 is equipped with the specific-original identifying circuit 1106 for identifying a specific original. As a result, it is possible to prevent a specific original, namely one which is not desired to be copied, from being outputted as a hard copy.

Figure 12:
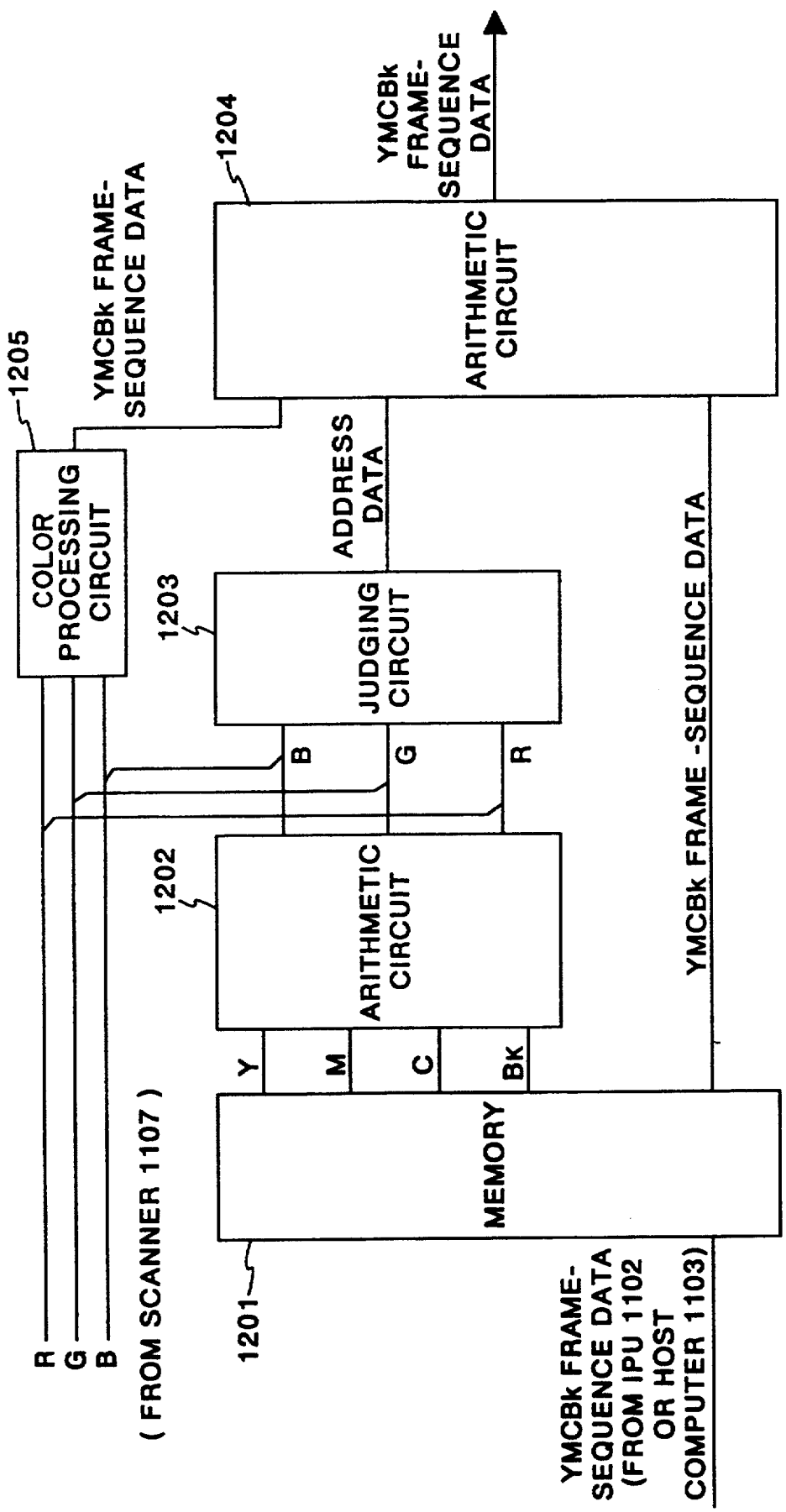
FIG. 12 is a block diagram showing the construction of a specific-original identifying circuit 1106 according to a third embodiment of the present invention.

FIG. 12 is a block diagram illustrating the construction of the specific-original identifying circuit 1106 according to the third embodiment. In FIG. 12, numeral 1201 denotes a memory for accumulating the frame-sequential color image signals Y, M, C, Bk sent from the IPU 1102 and the host computer 1103. The memory 1201 converts the accumulated color image signals into dot-sequence signals and outputs the latter. Numeral 1202 denotes an arithmetic circuit having the construction shown in FIG. 22, and 1203 a judging circuit having the construction shown in FIG. 13. These circuits will be described later. Numeral 1204 designates an arithmetic circuit which, in accordance with address data distinguished by the judging circuit 1203 as being indicative of a specific original, converts the pixels, at the pertinent addresses, of the Y, M, C, Bk output signals into black signals and then outputs the black signals. Numeral 1205 represents a color processing circuit for processing the RGB dot-sequence data from the scanner 1107 and inputting the Y, M, C, Bk frame-sequence data to the arithmetic circuit 1204 at a predetermined timing.

Since the dot-sequence data from the scanner 1107 already has a form capable of being discriminated, it is inputted to the judging circuit 1203 directly.

FIG. 22 is a block diagram illustrating the construction of the arithmetic circuit 1202 according to the third embodiment. In FIG. 22, numerals 1901, 1902, 1903 denote adders for adding the C and Bk signals, the M and Bk signals and the Y and Bk signals, respectively. Numerals 1904, 1907 and 1910 denote multipliers for multiplying the output of the adder 1901 by predetermined constants $a_{11}$, $a_{21}$ and $a_{31}$, respectively. Numerals 1905, 1908 and 1911 denote multipliers for multiplying the output of the adder 1902 by predetermined constants $a_{12}$, $a_{22}$ and $a_{32}$, respectively. Numerals 1906, 1909 and 1912 denote multipliers for multiplying the output of the adder 1903 by predetermined constants $a_{13}$, $a_{23}$ and $a_{33}$, respectively. Numerals 1913, 1914, 1915 denote adders for adding the outputs of the multipliers 1904, 1905 and 1906; the outputs of the multipliers 1907, 1908 and 1909; and the outputs of the multipliers 1910, 1911 and 1912; respectively. The adders 1913, 1914, 1915 output R, G, B signals, respectively.

In operation, the C, M, Y signals converted in dot-sequence fashion by the memory 1201 are sent to the adders 1901, 1902, 1903, respectively. The Bk signal is branched to enter the adders 1901, 1902, 1903 separately. Based on the input signals applied thereto, the adders 1901, 1902, 1903 perform the calculations C′=C+Bk, M′=M+Bk, Y′=Y+B, respectively, and output C′, M′, Y′ to the multipliers 1904–1912. The outputs of the multipliers 1904–1912 are delivered to the adders 1913–1915 in manner illustrated, and the calculated sums are outputted as R, G, B. The operation described above may by expressed by the following equation:

$$\begin{bmatrix} R \\ G \\ B \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} Y' \\ M' \\ C' \end{bmatrix} \quad (2)$$

In this embodiment the matrix shown by the equation (2) is the inverse matrix of a matrix of coefficients at the time of masking processing carried out in conventional color processing.

The R, G, B signals obtained by the foregoing operations are sent to the judging circuit 1203.

Figure 13:
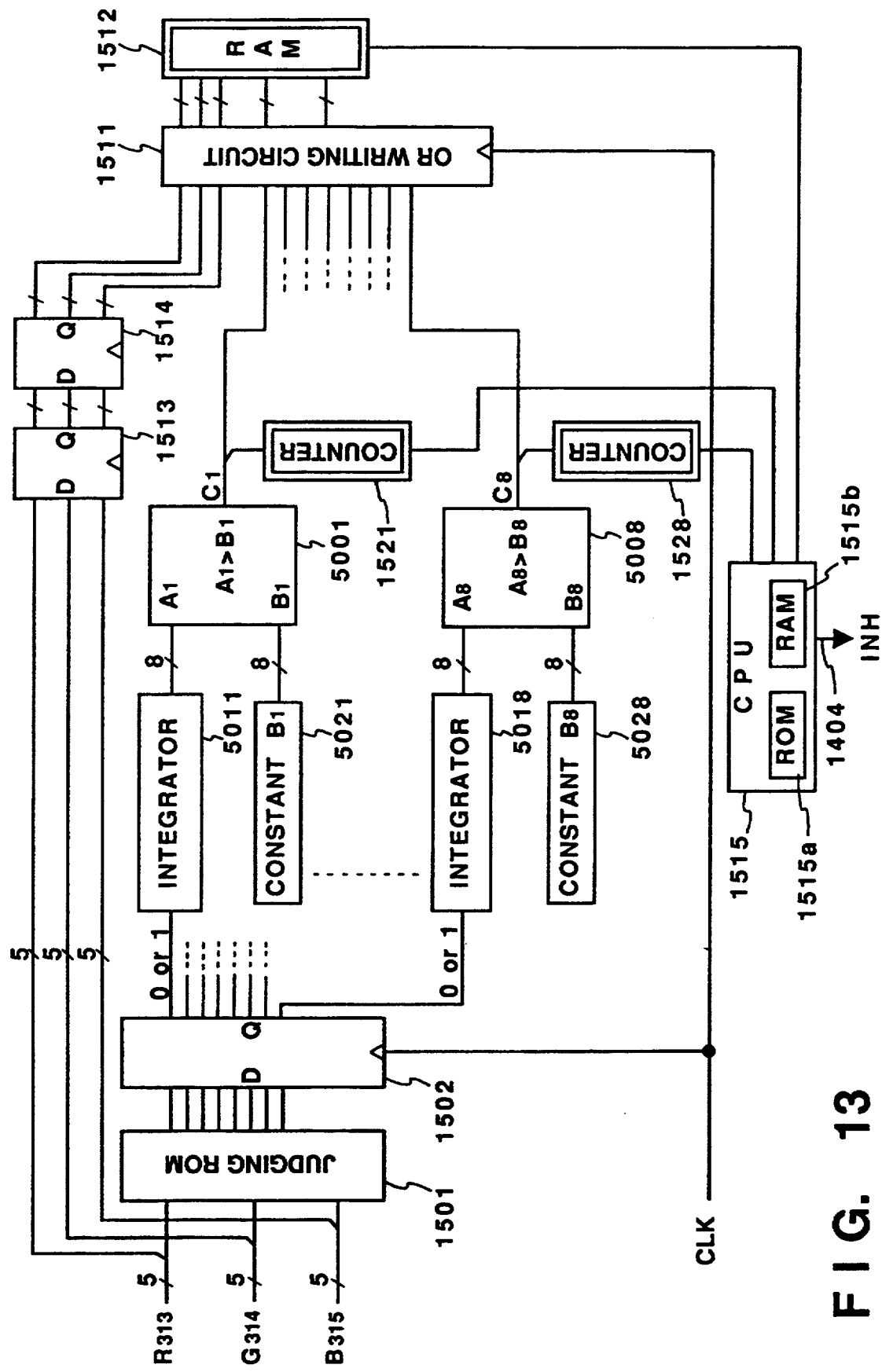
FIG. 13 is a block diagram showing the construction of a judging circuit 1203 illustrated in FIG. 12.
Figure 16:
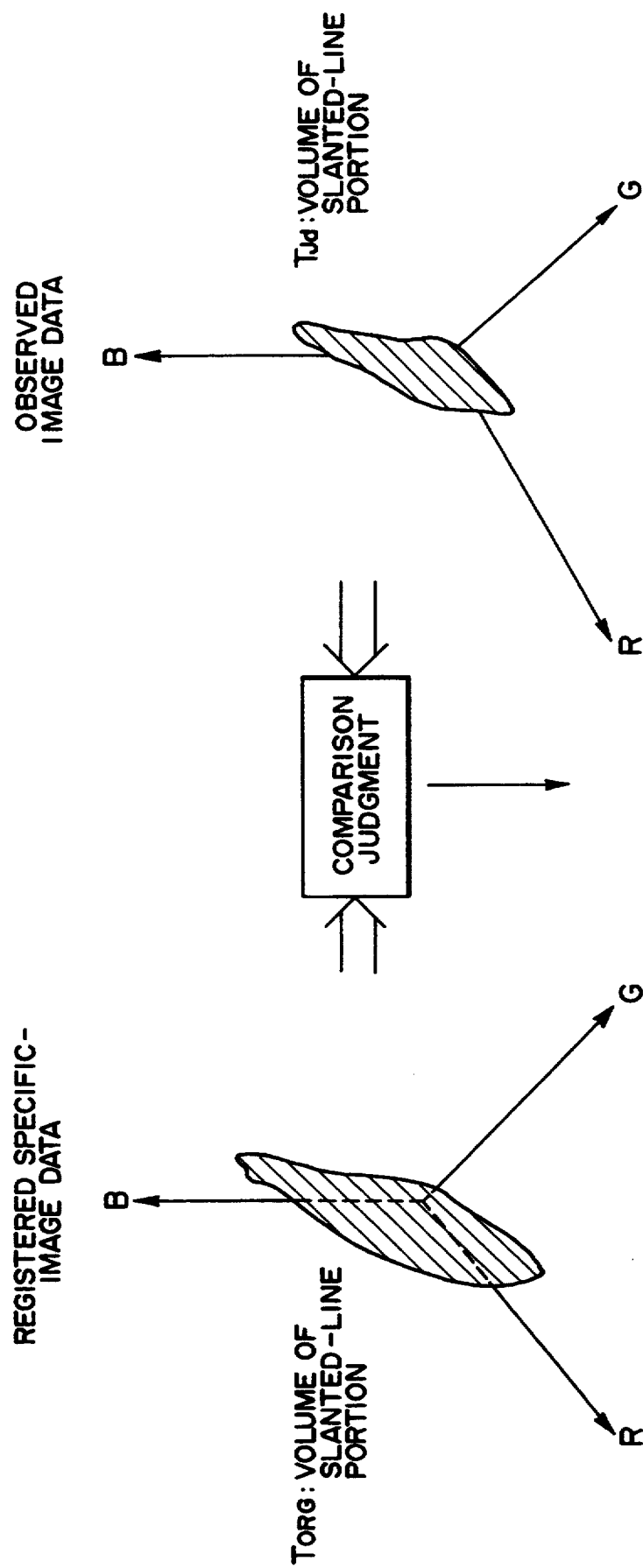
FIG. 16 is a diagram for describing a method of judging a specific original according to the third embodiment.
Figure 17:
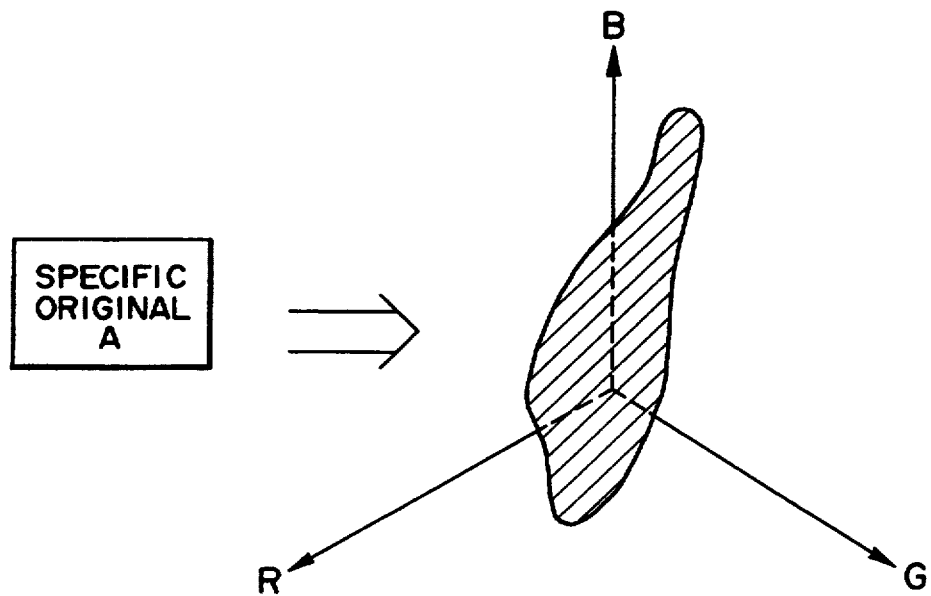
FIGS. 17 and 18 are diagrams for describing the relationship between a specific original and color space in the third embodiment.
Figure 18:
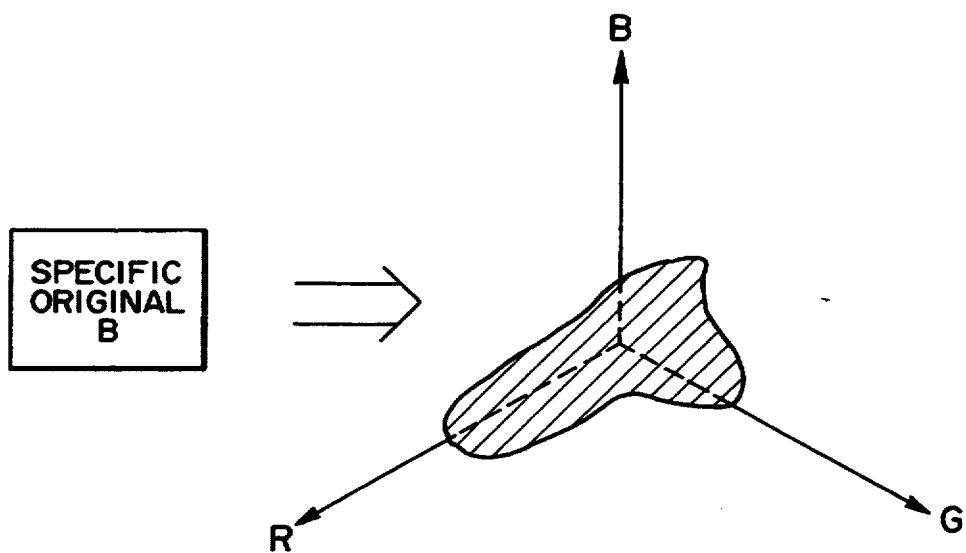
Figure 19:
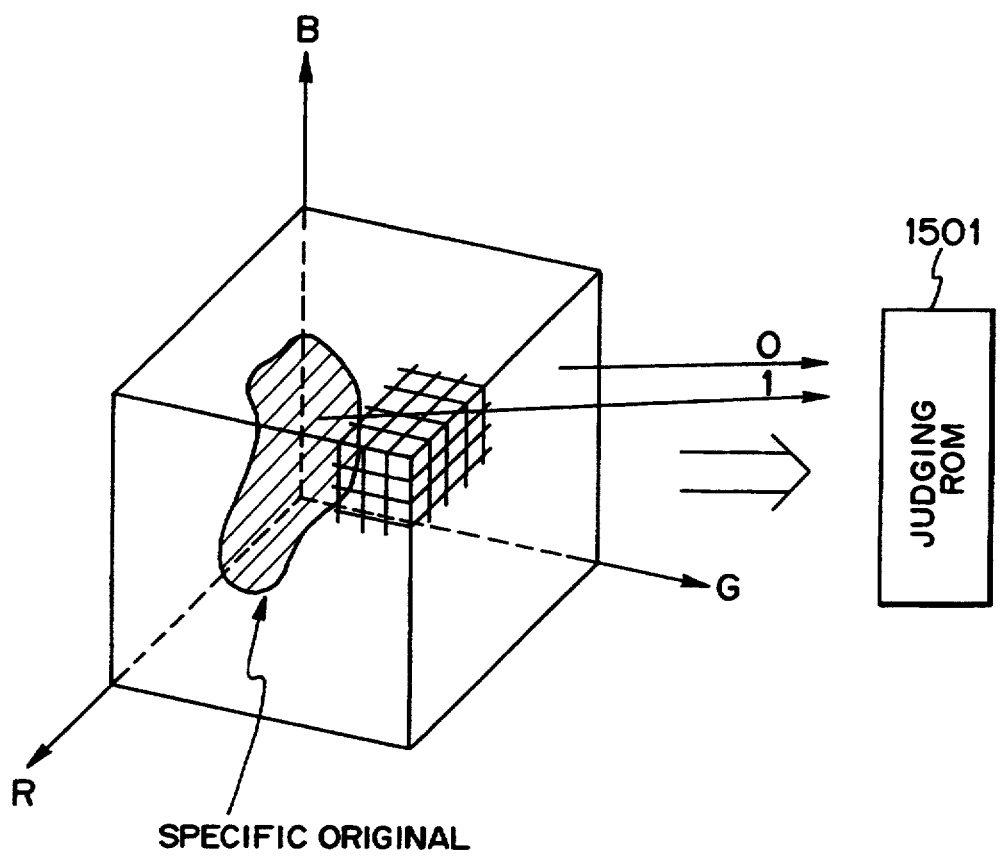
FIG. 19 is a diagram showing the relationship between color-space data of a specific original and data in judging ROM 1501 in the third embodiment.
Figure 20:
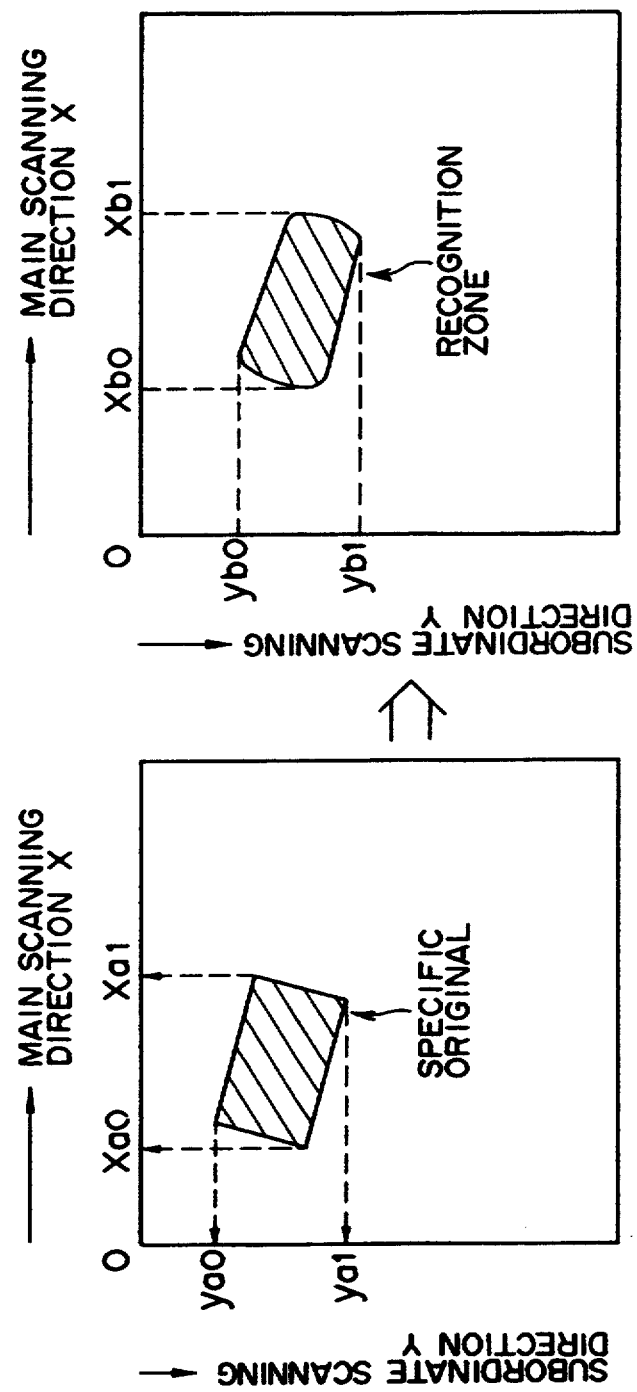
FIG. 20 is a diagram showing the positional relationship between a specific original and a recognition zone in the third embodiment.

FIG. 13 is a block diagram illustrating the construction of the judging circuit 1203 shown in FIG. 12, FIG. 16 is a diagram for describing a method of judging a specific original according to the third embodiment, FIGS. 17 and 18 are diagrams for describing the relationship between a specific original and color space in the third embodiment, FIG. 19 is a diagram showing the relationship between color-space data of a specific original and data in a judging ROM in the third embodiment, and FIG. 20 is a diagram showing the positional relationship between a specific original and a recognition zone in the third embodiment.

<Judging ROM>

A judging ROM 1501 stores written information indicating whether the image data of specific originals illustrated in FIGS. 17, 18 and 19 exist in the corresponding color space R, G, B. In a case where input color signals 313, 314, 315 match the image portions of specific originals indicated by the slanted-line portions in the RGB spaces shown in FIGS. 17 and 18, "1" is the output signal of the judging ROM 1501; otherwise, "0" is the output signal of the ROM.

In this embodiment, the judging ROM 1501 is constituted by a read-only memory having a data width of eight bits and an address width of 15 bits and stores data corresponding to eight types of specific originals.

The above-mentioned judgment information outputted by the judging ROM 1501 enters integrators 5011–5018 through a latch circuit 1502.

The integrators 5011–5018 are of identical construction, and therefore only the integrator 5011 will be described as an example.

Figure 24:
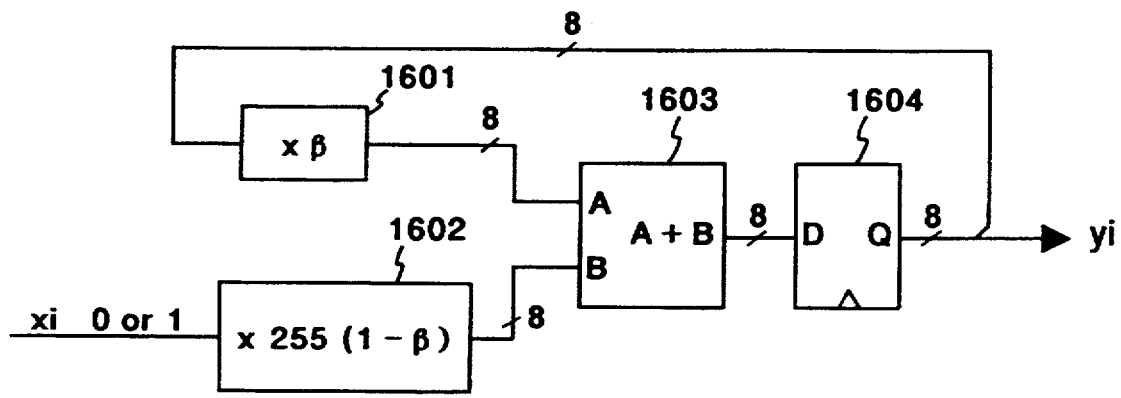
FIG. 24 is a block diagram showing the construction of an integrator 5011 according to the third embodiment.

FIG. 24 is a block diagram for describing the integrator 5011 according to the third embodiment.

In FIG. 24, numerals 1601, 1602 denote multipliers, 1603 an adder, and 1604 a latch circuit for timing adjustment. In response to an inputted $i^{th}$ signal $x_i$ ("0" or "1"), the multiplier 1602 performs the multiplication $x_i \times 255 (1-\beta)$ using a predetermined weighting coefficient $\beta$. The product is inputted to the B-side of the adder 1603. On the other hand, in response to an $(i-1)^{th}$ output signal $Y_{i-1}$ from the latch circuit 1604, the multiplier 1601 performs the multiplication $Y_{i-1} \times \beta$ and inputs the product to the Aside of the adder 1603. The latter performs the addition operation $x_i \times 255 (1-\beta) + Y_{i-1} \times \beta$ and outputs the result as $y_i$. In other words, the integrator 5011 performs the operation indicated by equation (3) below:

$$y_i = x_i \times 255 (1-\beta) + \beta \cdot y_{i-1} \quad (3)$$

That is, the integrator 5011 is a circuit which executes the integration processing of Eq. (3) with regard to all input data.

Figure 25A:
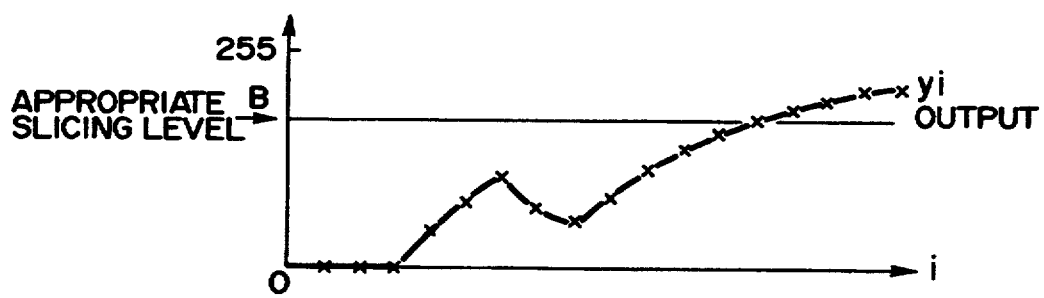
FIGS. 25A and 25B are diagrams for describing the results of integration according to the third embodiment.
Figure 25B:
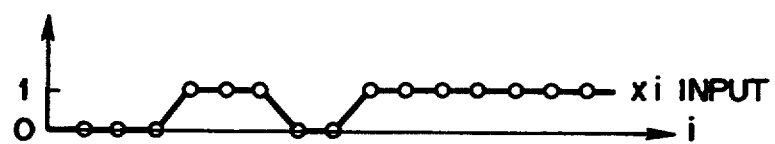

FIG. 25A and FIG. 25B are diagrams for describing the effects of integration according to the third embodiment.

In a case where an input value "1" to the integrator 5011 continues, as shown in FIG. 25A, the output value from the integrator 5011 approaches 255, as shown in FIG. 25B, owing to execution of the foregoing operations. In a case where the input value "0" continues, the output value approaches "0".

Comparing arithmetic units 5001–5008 (FIG. 13) are identically constructed, and therefore only the comparing arithmetic unit 5001 will be described as an example. The comparing arithmetic unit 5001 compares the output value A1 from the integrator 5011 and a value B1 of a predetermined constant stored in a register 5021, and outputs a judgment signal indicated at C1. The values of C1 are as follows, in accordance with Eq. (4):

$$C1 = 1: A1 > B1$$

$$C1 = 0: A1 \leq B1 \quad (4)$$

By virtue of this processing, the output C1 of the comparing arithmetic unit 5001 becomes "1" in a case where the input color signal continuously matches the image data of the specific original. It should be noted that the comparing arithmetic units 5002–5008 and registers 5022–5028 function in the same manner as the comparing arithmetic unit 5001 and register 5021, respectively.

Counters 1521–1528 are identically constructed and therefore only the counter 1521 will be described as an example. The counter 1521 is counted up only when the output C1 is "1". The number of pixels contained in the specific-original recognition zone indicated by the slanted-line portion in FIG. 20 is calculated by the counter 1521.

An OR writing circuit 1511 writes the OR of the output signals C1–C8 of the comparing arithmetic units 5001–5008 in a RAM 1512. The RAM 1512 has a bit width of eight bits and an address width of 16 bits, namely a size identical with that of the ROM 1501.

Figure 14:
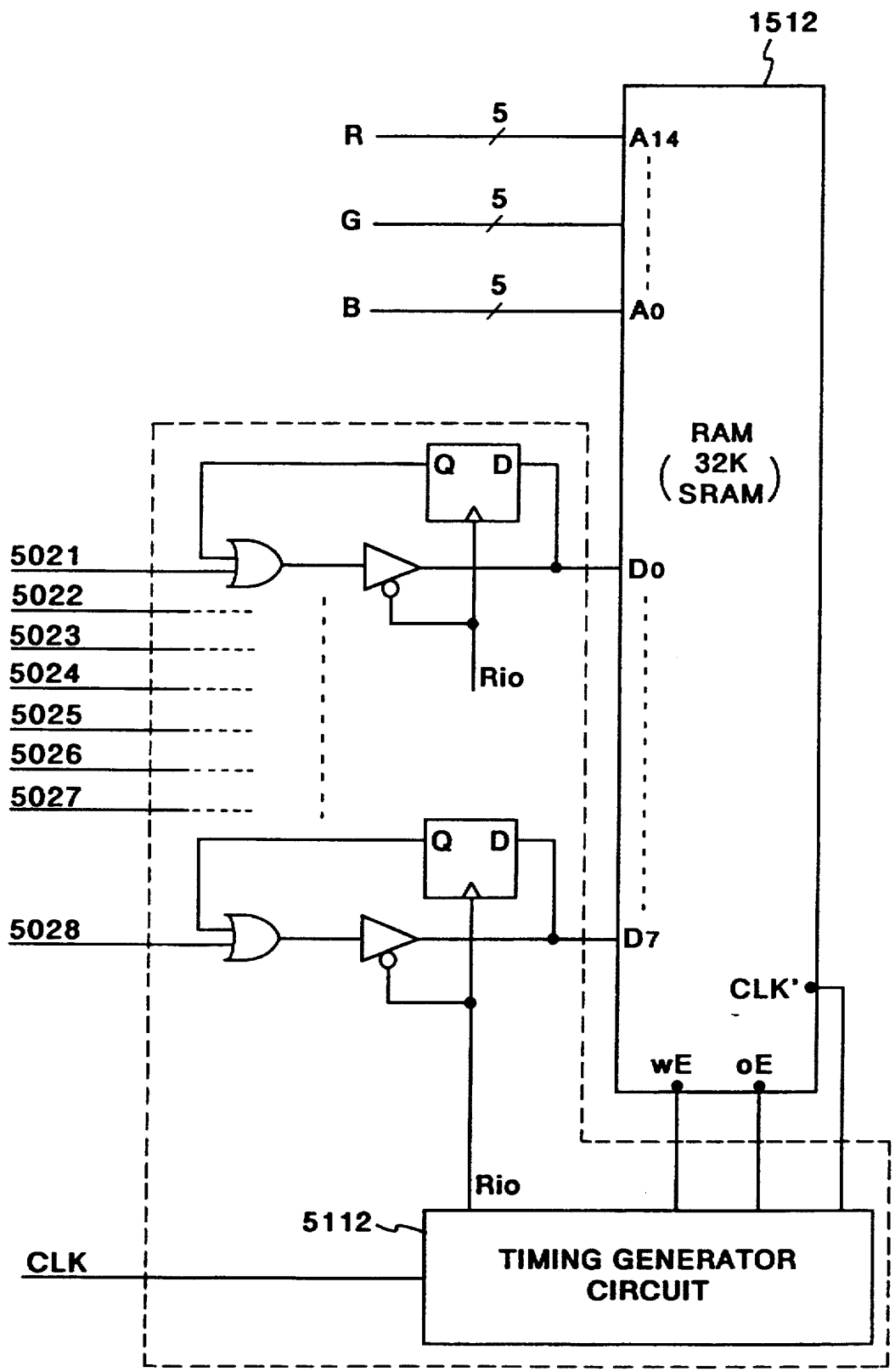
FIG. 14 is a block diagram showing the construction of an OR writing circuit 1511 according to the third embodiment.
Figure 15:
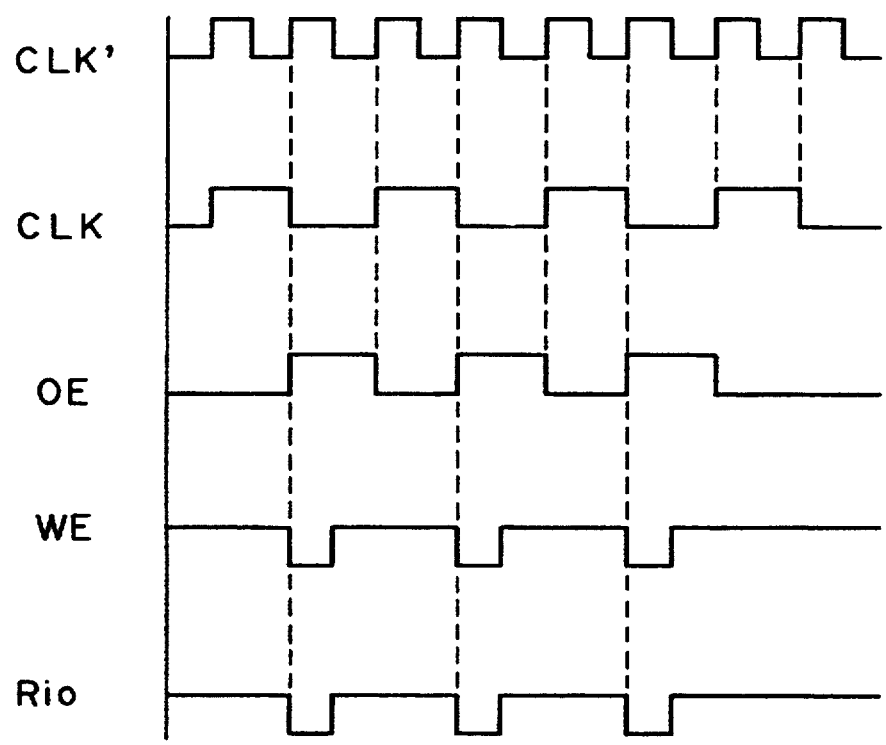
FIG. 15 is a timing chart of a timing generating circuit 5112 according to the third embodiment.

FIG. 14 is a block diagram showing the construction of the OR writing circuit 1511 according to the third embodiment, and FIG. 15 is a timing chart of a timing generating circuit according to the third embodiment.

In FIG. 14, the RAM 1512, which is constituted by a 32K SRAM, is addressed by three five-bit signals R, G, B, with the 15 bits being inputted to $A_0$–$A_{14}$ serving as an address bus. Also inputted to $D_0$–$D_7$ of the RAM 1512 as data are items of data 5021–5028 resulting from an OR operation, described below. Numeral 5112 denotes a timing generating circuit for generating the timing signal shown in FIG. 15.

About OR arithmetic unit within the slanted lines, stored data is read out from D0–D7 in dependence upon a read-enable signal OE at the timing of a clock CLK', with regard to addresses designated by $A_0$–$A_{14}$. The data is latched in respective latch circuits. The inputted signals 5021–5028 and the latched memory data are OR-ed by respective OR gates, and outputs are obtained from respective buffers at an inverter timing Rio.

Thus, with respect to each address stipulated by five bits of each of the R, G, B signals, if at least one item of the data sequentially inputted by the signals 5021–5028 is "1", this data is stored in the RAM 1512.

Since $D_0$–$D_7$ are stored at mutually independent addresses, judgment processing can be performed with regard to eight types of specific originals.

The volume of the R, G, B space of the slanted-line portion, which is the observed data in FIG. 16, is calculated by measuring the number of bits of the judgment result "1" stored in the RAM 1512.

Numeral 1515 represents a CPU which performs control of the overall specific-original judging unit 1403. The CPU 1515 has a ROM 1515a storing a program in accordance with the flowchart of FIG. 21 for operating the CPU 1515, and a RAM 1515b used as the working area of various programs. The CPU 1515 mainly reads data from the counters 1521-1528 and RAM 1512, and determines whether an original of interest is present in an input original.

The input to the integrator of FIG. 13 is indicated by $X_i$, and the output from the integrator is indicated by $y_i$ ($1 \leq i < 8$). An operation in accordance with equation (5) below is performed as processing:

$$Y_{i+1} = \beta \cdot y_1 + 255(1-\beta D)X_i \quad (5)$$

In Eq. (5), $\beta$ represents a constant for controlling the integrating effect of the integrator. Further, the following relation holds in the range $0 < \beta < 1$:

$$0 \leftarrow \beta \rightarrow 1$$

(small) (integrating effect) (large)

In other words, a curve indicative of the change in the integrated value varies more gently the closer the set value of $\beta$ shown in FIG. 28B approaches 1. Conversely, the curve varies more sharply the closer the set value of $\beta$ approaches 0. In the third embodiment, $\beta = 31/32$.

Here the subject to undergo recognition is assumed to be an original whose size is approximately that of a bank note. However, in case of a subject which is a smaller original image, such as a postage stamp, a smaller value of $\beta$, such as $\frac{7}{8}$, would be appropriate. It is permissible to adopt an arrangement in which the value of $\beta$ can be set at will by a scanning unit (not shown) in dependence upon the subject to undergo recognition.

Figure 21:
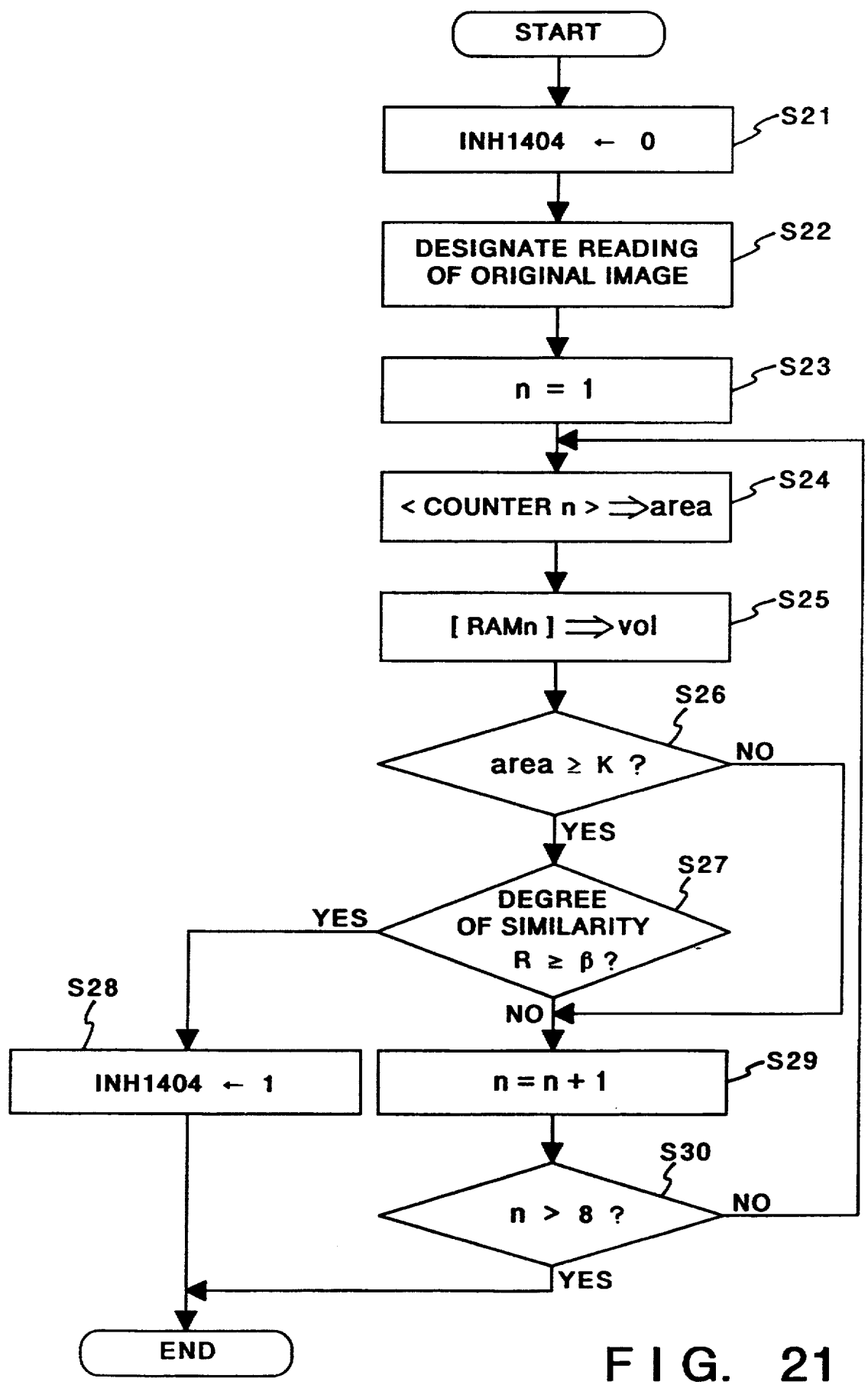
FIG. 21 is a flowchart for describing the operation performed by a CPU in the third embodiment.

FIG. 21 is a flowchart for describing the operation performed by the CPU according to the third embodiment.

First, when information indicative of the start of reading of an original is sensed, an INH 1404 signal indicating the start of reading of the original is set to "0" at step S21. Thereafter, reading of the original is designated at step S22. A variable n is set to 1 at step S23. That is, the counter value of an $n^{th}$ counter is successively stored in the RAM 1512. Next, at step S24, the value in the counter of FIG. 13 which, in this case, is the counter 1521 because n=1 holds, is read, and this value is stored as a variable area set in the RAM 1512. Then, at step S25, the total number of 1's stored as the variable area in the RAM 1512 of FIG. 13 is calculated, and this value is set as a variable vol. Here the variable vol is a value which indicates the volume of the slanted-line portion in FIG. 16. In other words, vol=$T_{jd}$.

It is determined at step S26 whether the value of the variable area exceeds a predetermined constant K.

The value of the variable area corresponds to the number of pixels in the recognition zone shown in the slanted-line portion of FIG. 20. Accordingly, by comparing the value of the variable area with the constant K, it is determined whether or not there is a possibility that the original is a bank-note original. In other words, if variable area > K holds, then it is judged that there is a possibility that the original is a bank-note original.

Next, at step S27, the value of the variable vol set at step S25, and the degree of similarity r (indicated by equation 6 shown below) of the observed image data in the color space and the image data in the specific original are calculated, and r is compared with the constant $\beta$.

In FIG. 16, $T_{ORG}$ represents the image data (hereinafter referred to as "specific image data") of an already registered specific original. $T_{ORG}$ corresponds to the slanted-line portion expressed in R, G, B space and indicates the volume in R, G, B coordinate space. $T_{jd}$ represents image data (hereinafter referred to as "observed image data") of a read original. $T_{jd}$ corresponds to the slanted-line portion, in which the observed image data for which the output signals of the comparing arithmetic units 5001-5008 become "1" is expressed in R, G, B space, and indicates the volume in R, G, B coordinate space. The degree of similarity r in this case is indicated by the following equation:

$$r = \frac{T_{jd}}{T_{ORG}} \quad (6)$$

This means that the more the value of the degree of similarity r approaches 1, the higher the similarity between the observed image data and the specific image data.

By establishing the relation vol=$T_{jd}$, $$r = \frac{vol}{T_{ORG}} \leq \gamma \quad (7)$$

is judged (where $\gamma$ is a constant determined by experimentation and indicates the matching factor in color space; here $\gamma = 0.7$ is assumed to hold). If Eq. (7) holds true, the similarity between the observed image data and the specific image data is high and it is decided that duplication of the original should be prohibited.

In a case where a specific original is judged to be present through the foregoing method, the address data of the portion at which the specific original exists is sent to the arithmetic circuit 1204. In the arithmetic circuit 1204, at step S28 the pixels at the pertinent addresses of the separately transmitted Y, M, C, Bk output signals are converted into black signals, which are then outputted. Against this, in steps 29 and 30, the above-mentioned process (the steps 24-27) is repeated about eight types of specific originals.

In accordance with the third embodiment, as described above, a specific original is judged by the Y, M, C, Bk signals, whereby a specific original can be distinguished even in an ordinary image copying operation using an image output unit or in a system which outputs an image upon receiving a signal from an external device.

(Fourth Embodiment)

Figure 23:
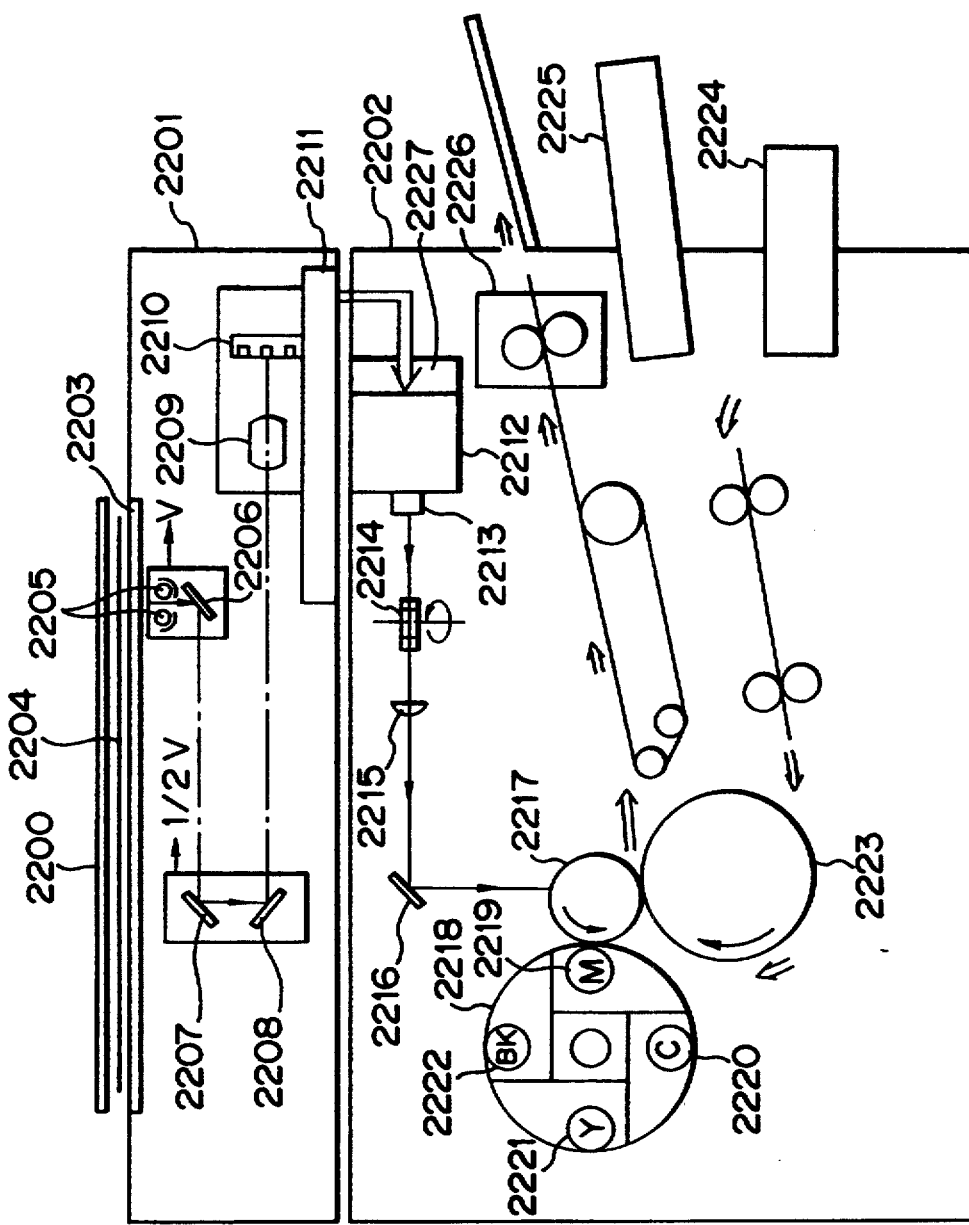
FIG. 23 is a side sectional view showing the construction of a copying machine to which a fourth embodiment of the image processing apparatus of the present invention is applied.

FIG. 23 is a side sectional view showing the construction of a copying machine to which a fourth embodiment of the image processing apparatus of the present invention is applied.

In FIG. 23, numeral 2201 denotes an image scanning section for scanning an original and performing digital signal processing. Numeral 2202 designates a printing section for printing out an image, which corresponds to the original image read by the scanning section 2201, on paper in full color.

The image scanning section 2201 includes a pressure plate 2200 having a mirror surface. An original 2204 on a glass platen 2203 is irradiated by means of lamps 2205, an image is formed on a three-line sensor (hereinafter referred to as a "CCD") 2210 via mirrors 2206, 2207, 2208 and a lens 2209, and the image is sent to a signal processor 2211 as full-color information red (R), green (G) and blue (B) components. The entire original is scanned by mechanically moving the lamps 2205 and mirror 2206 at a velocity v as well as the mirrors 2207, 2208 at a velocity ½ v in a direction perpendicular to the electrical scanning direction of the line sensor. The signal processor 2211 electrically processes the read signal, separates the signal into magenta (M), cyan (C), yellow (Y) and black (Bk) components and sends these components to the printing section 2202. At least one component among the M, C, Y, Bk components is sent to the printing section 2202 per scan of the original in the image scanning section 2201, and a signal print-out is completed by a total of four scans of the original.

The M, C, Y or Bk image signal received from the image scanning section 2201 is sent to a laser driver 2212. The laser driver 2212 modulates and drives a semiconductor laser 2213 in dependence upon the particular image signal. The laser light is made to scan across a photosensitive drum 2217 via a polygon mirror 2214, an f-$\theta$ lens 2215 and a mirror 2216.

Numeral 2218 denotes a revolving developer comprising a magenta developing section 2219, a cyan developing section 2220, a yellow developing section 2221 and a black developing section 2222. These four developers come into alternate contact with the photosensitive drum 2217 so that an electrostatic latent image formed on the photosensitive drum 2217 is developed by means of toners. Numeral 2223 denotes a transfer drum upon which paper fed from a paper cassette 2224 or 2225 is wound so that the image developed on the photosensitive drum 2217 may be transferred to the paper.

After the four colors M, C, Y, Bk have thus been transferred successively, the paper is ejected through a fixing unit 2226.

In an ordinary color-image copying machine of the above-described kind, an original judging circuit 2227 is provided in front of the laser driver 2212 according to the fourth embodiment. The construction of the original judging circuit 2227 is the same as that illustrated in the third embodiment. This makes it possible to prevent copying of a specific original, namely an original whose duplication is undesirable.

(Fifth Embodiment)

The present invention covers also a fifth embodiment in which, in each of the third and fourth embodiments, a frame-sequence signal signal, namely an input signal to an image output unit, is converted into the point-sequence Y, M, C, Bk signals by the memory 1201 and arithmetic circuit 1202 of FIG. 12, the signal values of Y, M, C are compared with the specific-original Y, M, C information stored in the judging ROM 1501 of FIG. 13, and the specific original is distinguished based upon the comparison.

In accordance with the fifth embodiment described above, the specific original is distinguished after the form of the signal is changed, as by converting the frame-sequence signal into the point-sequence signals or changing the YMC color space to RGB color space. As a result, it is possible to distinguish a specific original irrespective of the form of the signal in the input device.

(Sixth Embodiment)

FIG. 26 is a block diagram showing a sixth embodiment of a copying machine to which the image processing apparatus of the present invention is applied. Numerals 7101, 7101' denote scanners for optically reading an original image and converting the read image into dot-sequential R, G, B parallel signals. Numeral 7102 represents an image processing unit (IPU), to which the R, G, B signals from the corresponding scanner 7101 are inputted, for performing a conversion from a luminance signal to a density signal and outputting Y, M, C, Bk signals. Numeral 7103 denotes a host computer, to which the R, G, B signals from the corresponding scanner 7101' are inputted, for performing a conversion from a luminance signal to a colorimetric system and outputting dot-sequential L*a*b* serial signals. Numeral 7104 denotes a still-video camera (hereinafter referred to as an "SV"), and 7105 a video tape recorder (hereinafter referred to as a "VTR"). Shown at 7100 is a signal processor connected to the IPU 7102, the host computer 7103, the SV 7104 and the VTR 7105, and to other input devices as well. An image signal is inputted to the signal processor 7100 in the form of the color space handled by each input device, and the signal processor 7100 converts this signal into a print signal. Numeral 7112 denotes an image output unit, such as a printer.

The signal processor 7100 includes an arithmetic circuit 7106 having a memory, a converting circuit 7107, a color processing circuit 7108, a specific-original identifying circuit 7109, and an inking circuit 7110. INH7404 indicates the result of the identification operation performed by the specific-original identifying circuit 7109.

In the operation of the signal processor 7100, a color original is separated into the three colors R, G, B and digitally read by the image scanner 7101, and the resulting R, G, B signals are sent to an apparatus, which has an image processing function, such as the IPU 7102 and host computer 7103. In the IPU 7102 or host computer 7103, the input RGB signals are converted into various color spaces by processing such as performed by the image processor of an ordinary digital color copying apparatus. This processing includes a logarithmic conversion, a masking operation and UCR. Thus, the input R, G, B signals are converted into Y, M, C, Bk signals; the R, G, B signals inputted to the IPU 7102 or host computer 7103 are converted into XYZ coordinates of an XYZ colorimetric system; and the image signals converted into XYZ are converted into L*a*b* of the L*a*b* colorimetric system.

When a conversion is made from R, G, B to the tri-stimulus values X, Y, Z of the XYZ colorimetric system and from the tri-stimulus values X, Y, Z to L*a*b* the conversion equations are as expressed by equations (8), (9) below in a case where the R, G, B signals are in line with the NTSC system.

$$\begin{bmatrix} X \\ Y \\ Z \end{bmatrix} = \begin{bmatrix} 0.6067 & 0.1736 & 0.2001 \\ 0.2988 & 0.5868 & 0.1144 \\ 0.0 & 0.0661 & 1.1150 \end{bmatrix} \begin{bmatrix} R \\ G \\ B \end{bmatrix} \quad (8)$$

$$\begin{aligned} L^* &= 166 \ (Y/Y_0)^{\frac{1}{3}} - 16 \\ a^* &= 504.3 \ [(X/X_0)^{\frac{1}{3}} - (Y/Y_0)^{\frac{1}{3}}] \\ b^* &= 201.7 \ [(Y/Y_0)^{\frac{1}{3}} - (Z/Z_0)^{\frac{1}{3}}] \\ (X_0 Y_0 Z_0 &= \text{const}) \end{aligned} \quad (9)$$

Image signals converted into various color-space signals are outputted to the signal processor 7100 by the IPU 7102, host computer 7103, etc., as described above. Meanwhile, the dot-sequential R, G, B parallel signals are outputted to the signal processor 7100 from the devices SV 7104, VTR 7105.

In a case where the image signals outputted by the various devices such as the IPU 7102, host computer 7103, SV 7104 and VTR 7105 are the frame-sequence Y, M, C, Bk signals, these signals are branched to two paths. One leads to the inking circuit 7110, and the other leads to the arithmetic circuit 7106. In a case where inputs to the signal processor 7100 are signals other than the Y, M, C, Bk signals, these signals enter the arithmetic circuit 7106. The latter is equipped with a memory through which the input signals are passed if they are dot-sequence image signals. If the input signals are frame-sequence signals, these are accumulated in the memory and converted into point-sequence signals. The signals outputted by the arithmetic circuit 7106 are R, G, B signals, Y, M, C, Bk signals, L*a*b* signals, X, Y, Z signals, etc. These signals are delivered to the converting circuit 7107, which converts the inputted image signals into image signals (R, G, B signals in this embodiment) having a certain common color space. The signals from the converting circuit, which have been converted into image signals of the common color space, are branched in two directions, one to the color processing circuit 7108 and the other to the specific-original identifying circuit 7109.

Since the construction and processing function of the converting circuit 7101 basically are similar to those of the arithmetic circuit 1202 (FIG. 22) described in the third embodiment, a detailed illustration and description are omitted.

Figure 27:
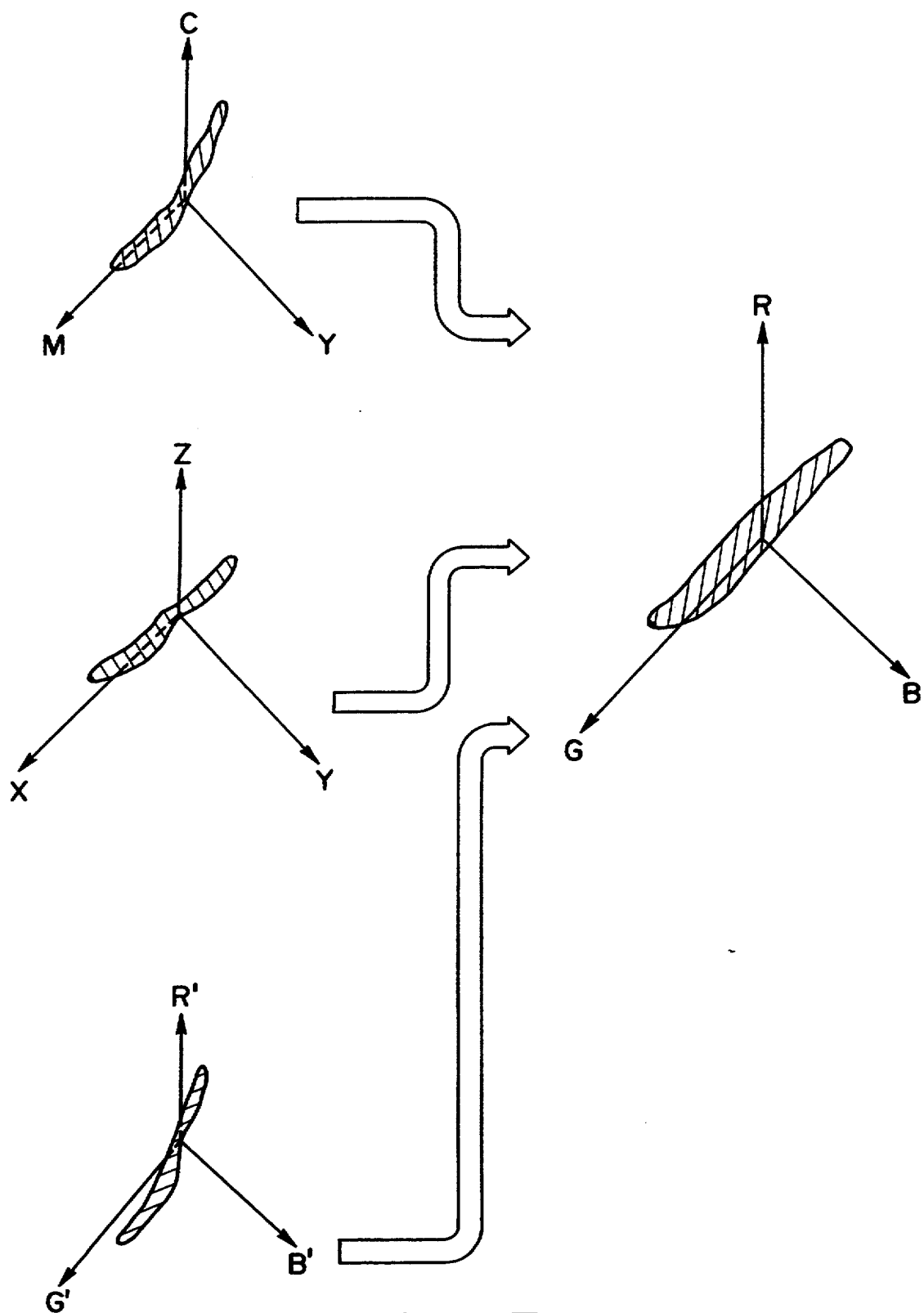
FIG. 27 is a diagram for describing the relationship between various color spaces and a common color space according to the sixth embodiment.

FIG. 27 is a diagram for describing the relationship between the various color spaces and the common color space according to the sixth embodiment.

The operation of the converting circuit 7107 will be described in simple terms taking YMCBk accepted from the arithmetic circuit 7106.

The processing of the C, M, Y signals and Bk signal outputted by the arithmetic circuit 7106 is the same as in the third embodiment. That is, R, G, B are calculated based upon the C, M, Y signals and the Bk signal.

The matrix used here is the inverse matrix of a matrix of coefficients at the time of masking processing carried out in conventional color processing.

More specifically, in a case where distortion occurs along the axes owing to the effects of spectral characteristics when an original is read, even when the image signals are image signals of different color spaces or of the same color space, signal conversion or normalization is performed to effect a conversion into image signals of a predetermined color space, as shown in FIG. 27.

The color processing circuit 7108 receives the R,G,B signals from the converting circuit 7107, performs a logarithmic conversion, masking and UCR processing and outputs frame-sequence Y, M, C, Bk signals. Meanwhile, the signals sent to the specific-original identifying circuit 7109 are judged, by a method described below, to determine whether there is a specific original in the input image signal. In a case where the specific original is present, this address data is sent to the inking circuit 7110, where a black header image is outputted based upon the address data. In a case where the input image signal does not contain a specific original, a signal indicative of this fact is sent to the inking circuit 7110, which responds by passing the output signal from the color processing circuit 7108 to the image output unit 7112. Here a hard copy is outputted in conformity with a PWM, thermal transfer or ink jet system.

Since the details of the specific-original identifying circuit 7109 are similar to those shown in FIGS. 13–21 discussed in connection with the third embodiment and those shown in FIGS. 24, 25A and 25B, these need not be described again.

In brief, in accordance with the sixth embodiment, various input signals are converted once into common color-space signals, after which a specific original is identified. As a result, identification of a specific original can be carried out in any system whatsoever. In addition, specific-original data stored in advance also may be data of a common color space, and therefore memory capacity may be reduced.

In a case where a variety of external devices are connected, it is possible to identify a specific original, without fear of erroneous judgments, irrespective of the spectral characteristics of the image readers of these external devices.

(Seventh Embodiment)

In a seventh embodiment of the present invention, a specific-original judging circuit is provided in front of the laser driver in the color-image copying machine (sixth embodiment). The construction of the specific-original judging circuit is similar to that illustrated in the sixth embodiment. This arrangement makes it possible to prevent copying of a specific original, namely an original whose duplication is undesirable.

The present invention may be applied to a system constructed of a plurality of devices or to an apparatus comprising a single device. It goes without saying that the present invention can be applied also to a case where the above-mentioned effects are attained by supplying a program to a system or apparatus.

A scanner may be applied not only to a type of RGB parallel output but also to a type of RGB dot-sequential output. An SV or VTR may be applied to a type of S terminal output or to a composite output. Color components can be made not only to RGB, YMCBk or L*a*b* but also to YIQ, Yuv, LCrCb, L*u*v* or the like.

Input can be made not only to frame-sequential, dot-sequential, and parallel, but also to line-sequential or block-sequential.

As many apparently widely different embodiments of the present invention can be made without departing from the spirit and scope thereof, it is to be understood that the invention is not limited to the specific embodiments thereof except as defined in the appended claims. Specially, combination of specific embodiments can be made without deporting from the spirit and scope thereof.

What is claimed is:

1. An image processing apparatus comprising:
   first input means for inputting first image data representing a first image in units of pixels;
   second input means for inputting second image data representing a second image different from the first image in units of pixels, the second input means being independent of the first input means;
   memory means for storing reference data relating to a third image;
   discriminating means for discriminating whether any of the first and second images is similar to the third image by comparing the first and second image data with the reference data; and
   controlling means for controlling the apparatus in accordance with the discrimination result of the discriminating means.

2. An apparatus according to claim 1, wherein said discriminating means performs discriminating operation using a plurality of different standards for the first and second image data respectively.

3. An apparatus according to claim 2, further comprising memory means for storing a plurality of standard data relating to said plurality of standards.

4. An apparatus according to claim 1, wherein said first input means inputs color image data of which color characteristic is different from color image data input by said second input means.

5. An image processing apparatus comprising:
first input means for inputting first image data representing a first image in units of pixels;
second input means for inputting second image data representing a second image different from the first image in units of pixels, the second input means being independent of the first input means:
discriminating means for discriminating whether any of the first and second images is a predetermined image;
controlling means for controlling the apparatus, in accordance with the discrimination result of the discriminating means; and
third input means for inputting third image data representing a third image different from the first and second images, in units of pixels.

6. An apparatus according to claim 1, wherein said discriminating means comprises a ROM for discriminating a color distribution of input image data.

7. An apparatus according to claim 1, further comprising processing means for adding a predetermined pattern to one of the first and second images when said discriminating means discriminates that one of the first and second images is said predetermined image.

8. A color processing apparatus comprising:
first input means for inputting first color image data representing a first color image in units of pixels;
second input means for inputting second color image data representing a second color image different from the first color image, in units of pixels, the second input means being independent of the first input means,
memory means for storing reference data relating to a third color image;
discriminating means for discriminating whether any of the first and second color images is similar to the third color image by comparing the first and second color image data with the reference data; and
controlling means for controlling the apparatus in accordance with the discrimination result of the discriminating means.

9. An apparatus according to claim 8, wherein said first input means inputs the first color image data frame-sequentially and said second input means inputs the second color image data dot-sequentially.

10. An apparatus according to claim 8, wherein said first input means inputs the first color image data serially and said second input means inputs the second color image data parallelly.

11. An apparatus according to claim 9, further comprising converting means for converting the frame-sequential first color image data to dot-sequential color image data.

12. An apparatus according to claim 10, further comprising converting means for converting the serial first color image data to parallel color image data.

13. An apparatus according to claim 9, wherein said first input means comprises a host computer and said second input means comprises an image reader which scans an original and generates data of a plurality of color components or a still video camera or a video camera.

14. An apparatus according to claim 11, wherein said converting means comprises a memory.

15. An apparatus according to claim 12, wherein said converting means comprises a memory.

16. An apparatus according to claim 8, further comprising third input means for inputting third color image data representing a third color image different from the first and second color image data.

17. An apparatus according to claim 8, wherein said discriminating means comprises a ROM for discriminating a color distribution of input image data.

18. An apparatus according to claim 8, further comprising processing means for adding a predetermined pattern to one of the first and second color images when said discriminating means discriminates that one of the first and second images is said predetermined color image.

19. An image processing apparatus comprising:
input means for inputting color image data representing a color image in a first type of color space;
converting means for converting the color image data in the first type of color space to converted color image data in a second type of color space different from the first type of color space;
discriminating means for discriminating whether the input color image is a predetermined color image having a predetermined pattern, based on the converted color image data; and
controlling means for controlling the apparatus in accordance with the discriminating result of the discriminating means.

20. An image processing apparatus according to claim 19, wherein said first type of color space is YMC or YMCK or L*a*b* color space and said second type of color space is RGB color space.

21. An image processing apparatus according to claim 19, wherein said discriminating means comprises ROM for discriminating a color distribution of input image data.

22. An image processing apparatus comprising:
input means for inputting a plurality of color component signals representing a color image in a first order;
converting means for receiving the plurality of color component signals and outputting the signals in a second order which is different from the first order;
discriminating means for discriminating whether the input color image represented by the color component signals is a predetermined color image having a predetermined pattern, based on the output signals from said converting means; and
controlling means for controlling the apparatus in accordance with the discrimination result of the discrimination means.

23. An apparatus according to claim 22, wherein said first order is a frame-sequential order and said second order is dot-sequential order.

24. An apparatus according to claim 22, wherein said first order is a serial order and said second order is a parallel order.

25. An image processing method comprising the steps of:
inputting color image data representing a color image in a first type of color space;

converting the color image data in the first type of color space to converted color image data in a second type of color space different from the first type of color space;

discriminating whether the input color image is a predetermined color image having a predetermined pattern, based on the converted color image data; and controlling processing of the image, in accordance with the discriminating result.

26. An image processing method comprising the steps of:

inputting a plurality of color component signals representing a color image in a first order;

converting the plurality of color component signals by receiving those signals and outputting the signals in a second order which is different from the first order;

discriminating whether the input color image represented by the color component signals is a predetermined color image having a predetermined pattern based on the output signals in said converting step; and controlling processing of the image, in accordance with the discrimination result.

* * * * *

UNITED STATES PATENT AND TRADEMARK OFFICE
CERTIFICATE OF CORRECTION

PATENT NO. : 5,430,525     Page 1 of 2
DATED     : July 4, 1995
INVENTOR(S) : EIJI OHTA, ET AL.

It is certified that error appears in the above-indentified patent and that said Letters Patent is hereby corrected as shown below:

On title page:

<u>At [56] U.S. PATENT DOCUMENTS</u>

"La lapria" should read --La Capria--.

<u>Column 1</u>

Line 25, "fore" should read --for--.

<u>Column 5</u>

Line 58, "$x_1$" should read --$x_i$--; and
Line 61, "$X_{x-1}$" should read --$X_{i-1}$--.

<u>Column 6</u>

Line 8, "$X_{x-1}$" should read --$X_{i-1}$--.

<u>Column 7</u>

Line 16, "parallely," should read --parallelly,--.

<u>Column 8</u>

Line 53, "Y' = Y+B" should read --Y' = Y + Bk--.

<u>Column 9</u>

Line 47, "Aside" should read --A-side--.

UNITED STATES PATENT AND TRADEMARK OFFICE
CERTIFICATE OF CORRECTION

PATENT NO. : 5,430,525
DATED : July 4, 1995
INVENTOR(S) : EIJI OHTA, ET AL.

It is certified that error appears in the above-indentified patent and that said Letters Patent is hereby corrected as shown below:

Column 10

Line 43, "About" should read --About the-- and "unit" should read --operation,--.

Column 11

Line 6, "($1 \leq i < 8$). should read --$1 \leq i \leq 8$)--.

Column 16

Line 47, "Deporting" should read --departing--.

Column 18

Line 2, "or a still" should read --for a still--.

Signed and Sealed this

Fifth Day of December, 1995

BRUCE LEHMAN

Attest:

Attesting Officer

Commissioner of Patents and Trademarks